US010841904B2

United States Patent
Yin et al.

(10) Patent No.: US 10,841,904 B2
(45) Date of Patent: Nov. 17, 2020

(54) SHORT PHYSICAL UPLINK CONTROL CHANNEL (PUCCH) DESIGN FOR 5TH GENERATION (5G) NEW RADIO (NR)

(71) Applicants: Sharp Kabushiki Kaisha, Sakai (JP); FG Innovation Company Limited, New Territories, Hong Kong (CN)

(72) Inventors: Zhanping Yin, Vancouver, WA (US); Toshizo Nogami, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 15/884,822

(22) Filed: Jan. 31, 2018

(65) Prior Publication Data
US 2018/0220415 A1    Aug. 2, 2018

Related U.S. Application Data

(63) Continuation of application No. PCT/US2018/015988, filed on Jan. 30, 2018.

(60) Provisional application No. 62/453,944, filed on Feb. 2, 2017.

(51) Int. Cl.
| | |
|---|---|
| *H04W 72/04* | (2009.01) |
| *H04W 72/14* | (2009.01) |
| *H04W 72/02* | (2009.01) |
| *H04B 1/7136* | (2011.01) |
| *H04L 5/00* | (2006.01) |

(52) U.S. Cl.
CPC ....... *H04W 72/0413* (2013.01); *H04W 72/02* (2013.01); *H04W 72/14* (2013.01); *H04B 1/7136* (2013.01); *H04L 5/005* (2013.01)

(58) Field of Classification Search
None
See application file for complete search history.

(56) References Cited

U.S. PATENT DOCUMENTS

| | | | |
|---|---|---|---|
| 2011/0243066 A1* | 10/2011 | Nayeb Nazar | H04L 1/007 370/328 |
| 2012/0046032 A1 | 2/2012 | Baldemair et al. | |
| 2015/0181588 A1* | 6/2015 | Song | H04L 1/1607 370/280 |

(Continued)

FOREIGN PATENT DOCUMENTS

WO    2016144243 A1    9/2016

OTHER PUBLICATIONS

Invitation to Pay Additional Fees issued for International Application No. PCT/US2018/015988 dated Apr. 3, 2018.

(Continued)

*Primary Examiner* — Diane L Lo
(74) *Attorney, Agent, or Firm* — ScienBiziP, P.C.

(57) ABSTRACT

A user equipment (UE) is described. The UE includes a processor and memory in electronic communication with the processor. Instructions stored in the memory are executable to acquire a first higher layer configuration indicating multiple sets of physical uplink control channel (PUCCH) resources, the multiple sets of PUCCH resources including at least a short PUCCH resource. The instructions are also executable to select a PUCCH resource from the sets of PUCCH resources. The instructions are further executable to transmit uplink control information (UCI) on the selected PUCCH resource.

10 Claims, 31 Drawing Sheets

(56) References Cited

U.S. PATENT DOCUMENTS

| | | | |
|---|---|---|---|
| 2016/0143017 A1* | 5/2016 | Yang | H04L 1/1812 370/329 |
| 2016/0226639 A1 | 8/2016 | Xiong et al. | |
| 2017/0164352 A1* | 6/2017 | Yang | H04L 5/0053 |
| 2018/0103485 A1* | 4/2018 | Jiang | H04W 8/22 |
| 2018/0176909 A1* | 6/2018 | Wikstrom | H04W 72/0446 |
| 2019/0007175 A1* | 1/2019 | Kwak | H04L 5/00 |

OTHER PUBLICATIONS

Huawei, HiSilicon, "Discussion on sPUCCH design," 3GPP TSG RAN WG1 Meeting #87, Reno, USA, R1-1611160, Nov. 18, 2016.

Qualcomm Incorporated, "Uplink Control Channel Design for Shortened TTI", 3GPP TSG RAN WG1 #87, Reno, USA, R1-1611639, Nov. 18, 2016.

Huawei, HiSilicon, "Short duration UL control channel design", 3GPP TSG RAN WG1 NR Ad-Hoc Meeting, Spokane, Washington, USA, R1-1700016, Jan. 20, 2017.

Huawei, HiSilicon, "Resource allocation of UL control channel", 3GPP TSG RAN WG1 NR Ad-Hoc Meeting, Spokane, Washington, USA, R1-1700018, Jan. 20, 2017.

MediaTek Inc., "Discussion on UL control channel structures with short duration", 3GPP TSG RAN WG1 NR Ad-Hoc Meeting, Spokane, Washington, USA, R1-1700173, Jan. 20, 2017.

MediaTek Inc., "Discussion on multiplexing of short PUCCH and UL data", 3GPP TSG RAN WG1 NR Ad-Hoc Meeting, Spokane, Washington, USA, R1-1700174, Jan. 20, 2017.

CATT, "Short PUCCH structure", 3GPP TSG RAN WG1 NR Ad-Hoc Meeting, Spokane, Washington, USA, R1-1700199, Jan. 20, 2017.

CATT, "On waveform configuration for PUCCH", 3GPP TSG RAN WG1 NR Ad-Hoc Meeting, Spokane, Washington, USA, R1-1700200, Jan. 20, 2017.

ZTE, ZTE Microelectronics, "UL Control Structure", 3GPP TSG RAN WG1 NR Ad-Hoc Meeting, Spokane, Washington, USA, R1-1700261, Jan. 20, 2017.

ZTE, ZTE Microelectronics, "UL control resource design", 3GPP TSG RAN WG1 NR Ad-Hoc Meeting, Spokane, Washington, USA, R1-1700263, Jan. 20, 2017.

Intel Corporation, "Short UL control early in a slot", 3GPP TSG RAN WG1 NR Ad-Hoc Meeting, Spokane, Washington, USA, R1-1700363, Jan. 20, 2017.

Intel Corporation, "UL control channel design with short duration", 3GPP TSG RAN WG1 NR Ad-Hoc Meeting, Spokane, Washington, USA, R1-1700364, Jan. 20, 2017.

Intel Corporation, "CM evaluation for short UL control channel", 3GPP TSG RAN WG1 NR Ad-Hoc Meeting, Spokane, Washington, USA, R1-1700365, Jan. 20, 2017.

Intel Corporation, "Link level evaluation and comparison of DMRS structures for short UL control channel", 3GPP TSG RAN WG1 NR Ad-Hoc Meeting, Spokane, Washington, USA, R1-1700366, Jan. 20, 2017.

Intel Corporation, "Resource allocation for NR uplink control channel", 3GPP TSG RAN WG1 NR Ad-Hoc Meeting, Spokane, Washington, USA, R1-1700369, Jan. 20, 2017.

LG Electronics, "Design of one-symbol NR-PUCCH format", 3GPP TSG RAN WG1 NR Ad-Hoc Meeting, Spokane, Washington, USA, R1-1700503, Jan. 20, 2017.

LG Electronics, "Design of short duration NR-PUCCH format", 3GPP TSG RAN WG1 NR Ad-Hoc Meeting, Spokane, Washington, USA, R1-1700504, Jan. 20, 2017.

Panasonic, "Discussion on uplink control channel for NR", 3GPP TSG RAN WG1 NR Ad-Hoc Meeting, Spokane, Washington, USA, R1-1700543, Jan. 20, 2017.

Guangdong OPPO Mobile Telecom, "Discussion on uplink control channel in short duration", 3GPP TSG RAN WG1 NR Ad-Hoc Meeting, Spokane, Washington, USA, R1-1700566, Jan. 20, 2017.

Guangdong OPPO Mobile Telecom, "Multiplexing of short UCI and UL data", 3GPP TSG RAN WG1 NR Ad-Hoc Meeting, Spokane, Washington, USA, R1-1700568, Jan. 20, 2017.

Etri, "Design considerations for UL control channel", 3GPP TSG RAN WG1 NR Ad-Hoc Meeting, Spokane, Washington, USA, R1-1700582, Jan. 20, 2017.

NTT Docomo, Inc., "Summary of [87-32]: UL L1/L2 control channel design for NR", 3GPP TSG RAN WG1 AH_NR Meeting, Spokane, USA, R1-1700618, Jan. 20, 2017.

NTT Docomo, Inc., "UL control channel structure in short duration", 3GPP TSG RAN WG1 NR Ad-Hoc Meeting, Spokane, Washington, USA, R1-1700622, Jan. 20, 2017.

Sharp, "5G NR short PUCCH considerations", 3GPP TSG RAN WG1 NR Ad-Hoc Meeting, Spokane, Washington, USA, R1-1700730, Jan. 20, 2017.

Qualcomm Incorporated, "Channelization of Short PUCCH", 3GPP TSG RAN WG1 NR Ad-Hoc Meeting, Spokane, Washington, USA, R1-1700823, Jan. 20, 2017.

Qualcomm Incorporated, "Location of short PUCCH", 3GPP TSG RAN WG1 NR Ad-Hoc Meeting, Spokane, Washington, USA, R1-1700824, Jan. 20, 2017.

Qualcomm Incorporated, "UL transmit diversity for PUCCH", 3GPP TSG RAN WG1 NR Ad-Hoc Meeting, Spokane, Washington, USA, R1-1700825, Jan. 20, 2017.

NEC, "Considerations on the design of uplink control channel", 3GPP TSG RAN WG1 NR Ad-Hoc Meeting, Spokane, Washington, USA, R1-1700864, Jan. 20, 2017.

Motorola Mobility, "Design for short duration uplink control channel", 3GPP TSG RAN WG1 NR Ad-Hoc Meeting, Spokane, Washington, USA, R1-1700881, Jan. 20, 2017.

Samsung, "UL Control Channel Design: Short Format", 3GPP TSG RAN WG1 NR Ad-Hoc Meeting, Spokane, Washington, USA, R1-1700952, Jan. 20, 2017.

Nokia, Alcatel-Lucent Shanghai Bell, "On the design of short PUCCH for NR", 3GPP TSG RAN WG1 NR Ad-Hoc Meeting, Spokane, Washington, USA, R1-1701015, Jan. 20, 2017.

Ericsson, "Short PUCCH Transmission—Impact of PUSCH Performance", 3GPP TSG RAN WG1 NR Ad-Hoc Meeting, Spokane, Washington, USA, R1-1701122, Jan. 20, 2017.

Ericsson, "Short PUCCH Transmission—Impact on Short PUSCH", 3GPP TSG RAN WG1 NR Ad-Hoc Meeting, Spokane, Washington, USA, R1-1701123, Jan. 20, 2017.

NTT Docomo, Inc. et al., "WF on PUCCH", 3GPP TSG RAN WG1 AH_NR Meeting, Spokane, Washington, USA, R1-1701418, Jan. 20, 2017.

LG Electronics et al., "WF on resource mapping for one-symbol NR-PUCCH", 3GPP TSG RAN WG1 AH_NR Meeting, Spokane, Washington, USA, R1-1701439, Jan. 20, 2017.

LG Electronics et al., "WF on short-duration PUCCH", 3GPP TSG RAN WG1 AH_NR Meeting, Spokane, Washington, USA, R1-1701485, Jan. 20, 2017.

LG Electronics et al., "We on PUCCH resource indication for NR", 3GPP TSG RAN WG1 AH_NR Meeting, Spokane, Washington, USA, R1-1701523, Jan. 20, 2017.

Iith et al., "WF on PUCCH in one symbol short duration low PAPR design", 3GPP TSG RAN WG1 AH_NR Meeting, Spokane, Washington, USA, R1-1701542, Jan. 20, 2017.

* cited by examiner

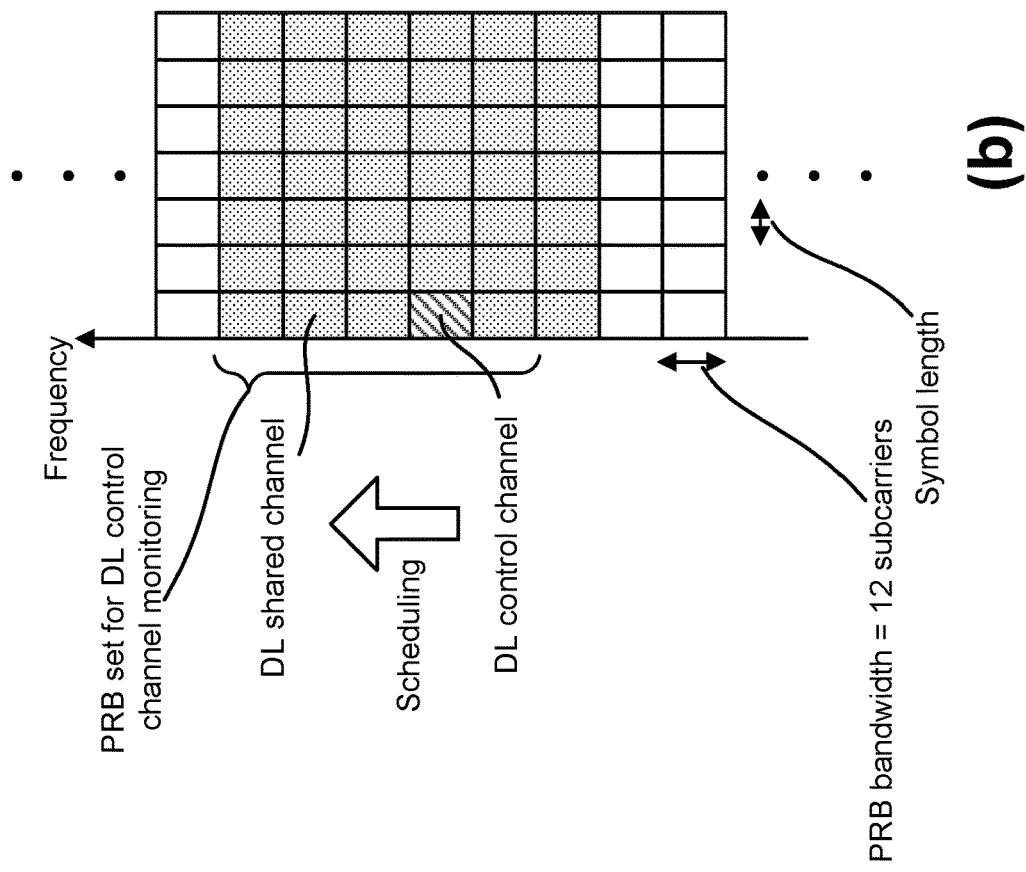
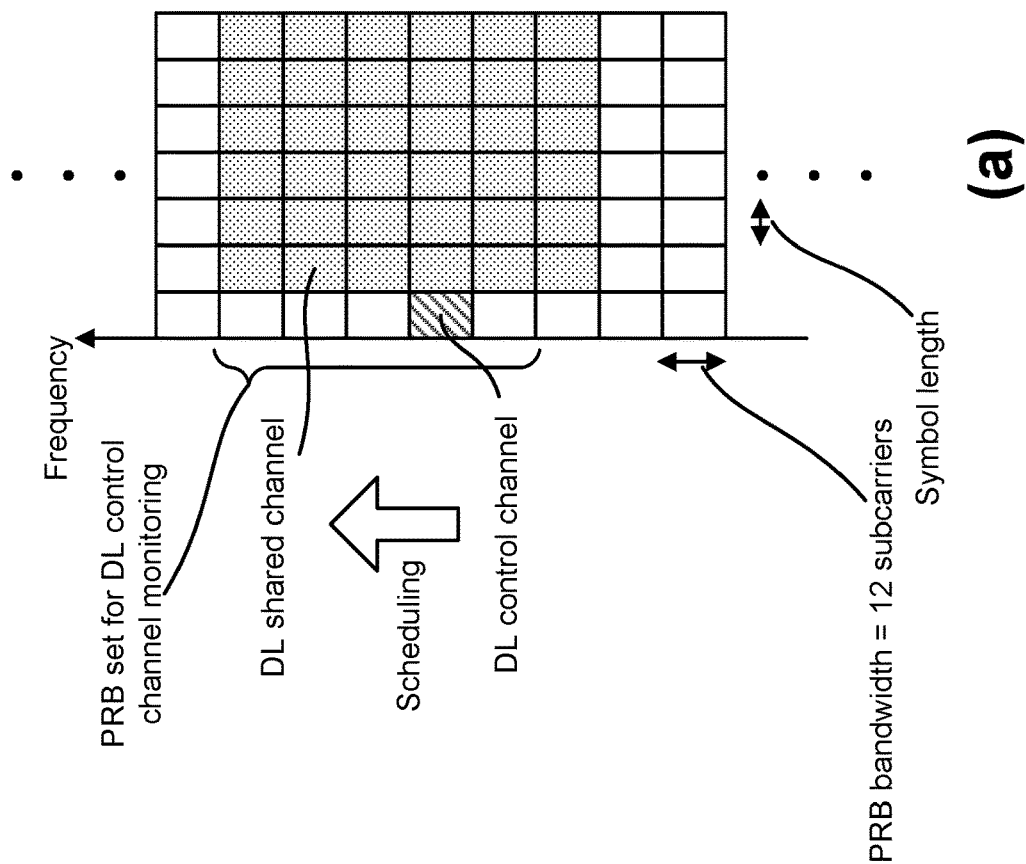
FIG. 8

d) Distributed PUCCH resource mapping in multiple PUCCH regions/subbands
c) Distributed PUCCH resource mapping in a PUCCH region/subband
b) Localized PUCCH resource mapping in multiple PUCCH regions/subbands
a) Localized PUCCH resource mapping in a PUCCH region/subband
FIG. 19

Reference Symbol (RS)
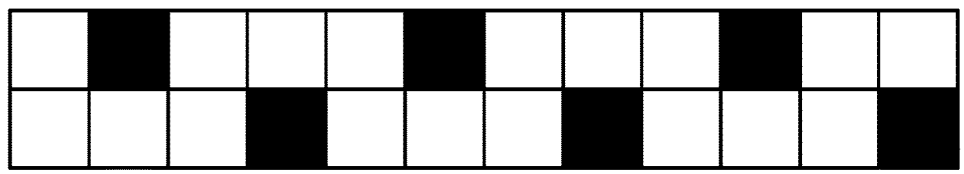
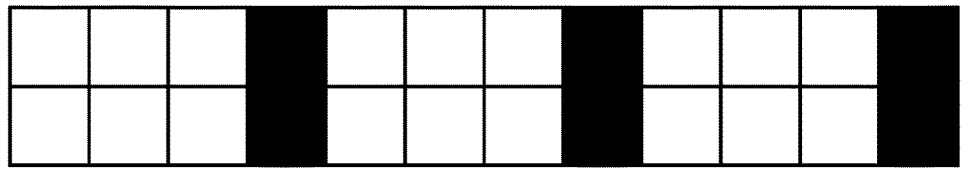
a) Approach 1: same RS pattern in two symbols
b) Approach 2: different RS patterns in two symbols
FIG. 21

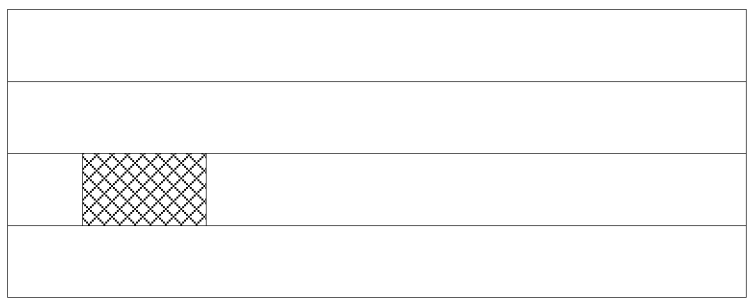
(c) 2-symbol short PUCCH can be transmitted in any two symbols within the configured PUCCH symbols
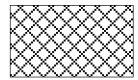
(b) 2-symbol short PUCCH can be transmitted in any two consecutive symbols within the configured PUCCH symbols
(a) 1-symbol short PUCCH can be transmitted in any one of the configured PUCCH symbols
FIG. 23

US 10,841,904 B2

SHORT PHYSICAL UPLINK CONTROL CHANNEL (PUCCH) DESIGN FOR 5TH GENERATION (5G) NEW RADIO (NR)

RELATED APPLICATIONS

This application is related to and claims priority from U.S. Provisional Patent Application No. 62/453,944, entitled "SHORT PHYSICAL UPLINK CONTROL CHANNEL (PUCCH) DESIGN FOR 5th GENERATION (5G) NEW RADIO (NR)," filed on Feb. 2, 2017, which is hereby incorporated by reference herein, in its entirety.

TECHNICAL FIELD

The present disclosure relates generally to communication systems. More specifically, the present disclosure relates to short physical uplink control channel (PUCCH) design for 5th generation (5G) new radio (NR).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 8 shows examples of downlink (DL) control channel monitoring regions;

FIG. 19 illustrates examples of 2-symbol PUCCH resource mapping;

FIG. 21 illustrates examples of RS located in two symbols;

FIG. 23 illustrates examples of short PUCCH transmission with beam sweeping;

DETAILED DESCRIPTION

Figure 1:
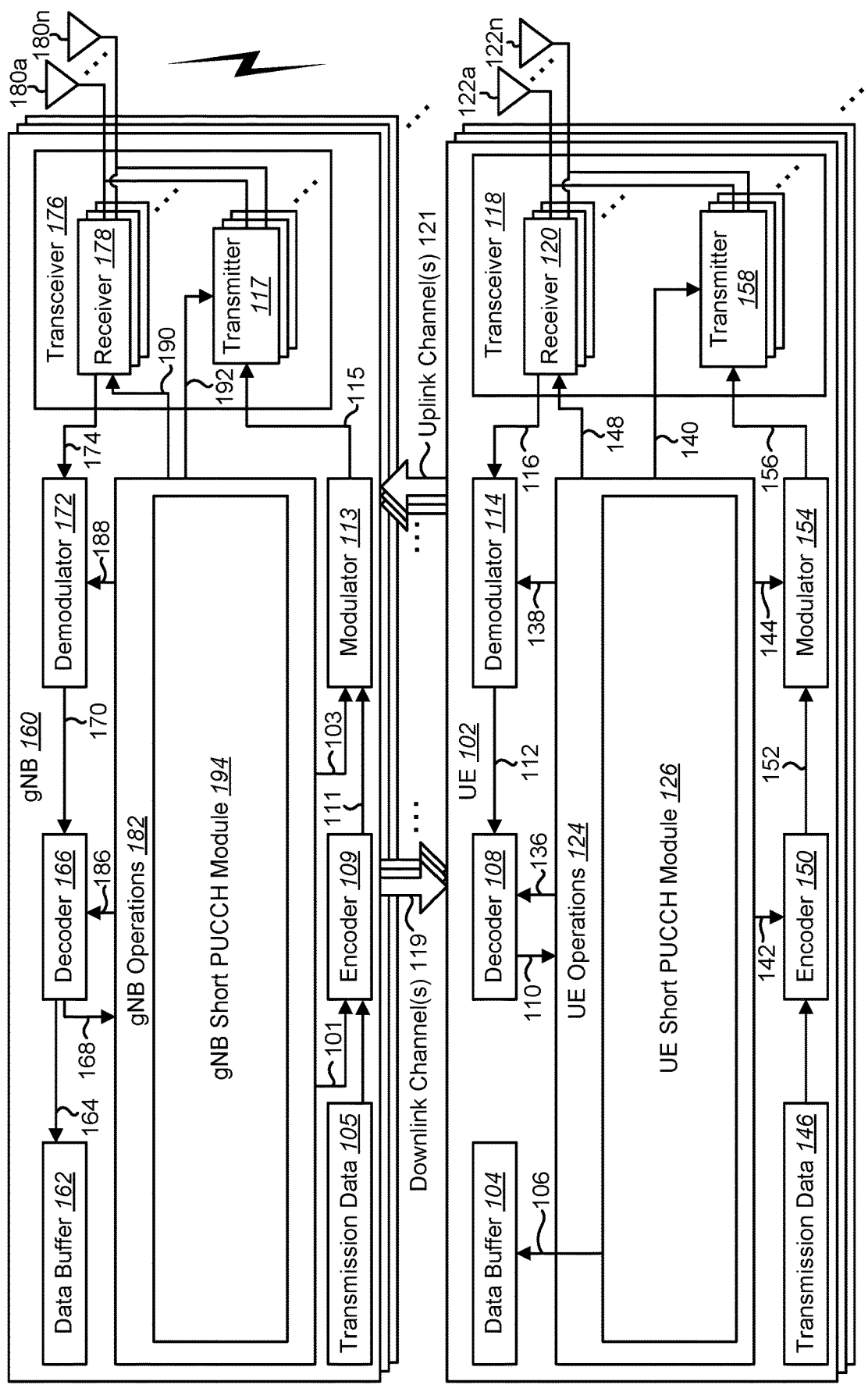
FIG. 1 is a block diagram illustrating one implementation of one or more base stations (gNBs) and one or more user equipments (UEs) in which systems and methods for short physical uplink control channel (PUCCH) design for 5th generation (5G) new radio (NR) may be implemented.

A user equipment (UE) is described. The UE includes a processor and memory in electronic communication with the processor. Instructions stored in the memory are executable to acquire a first higher layer configuration indicating multiple sets of physical uplink control channel (PUCCH) resources, the multiple sets of PUCCH resources including at least a short PUCCH resource. The instructions are also executable to select a PUCCH resource from the sets of PUCCH resources. The instructions are further executable to transmit uplink control information (UCI) on the selected PUCCH resource.

The first higher layer configuration may include at least a starting symbol index, a starting resource block (RB) index, a number of symbols, a number of resource blocks (RBs), and whether frequency hopping is applied in a case of a short PUCCH with two symbols.

In a case that frequency hopping is configured for a two symbol PUCCH, PUCCH demodulation reference signal (DMRS) locations in both symbols are the same between two symbols. In a case that transmit diversity is configured, another PUCCH resource which is linked to the selected PUCCH resource is selected.

Selecting a PUCCH resource from the sets of PUCCH resources may be based on a dynamic downlink control information (DCI) indication of the PUCCH resource index.

A base station is also described. The base station includes a processor and memory in electronic communication with the processor. Instructions stored in the memory are executable to send a first higher layer configuration indicating multiple sets of physical uplink control channel (PUCCH) resources, the multiple sets of PUCCH resources including at least a short PUCCH resource. The instructions are also executable to select a PUCCH resource from the sets of PUCCH resources. The instructions are further executable to receive uplink control information (UCI) on the selected PUCCH resource.

A method for a UE is also described. The method includes acquiring a first higher layer configuration indicating multiple sets of PUCCH resources, the multiple sets of PUCCH resources including at least a short PUCCH resource. The method also includes selecting a PUCCH resource from the sets of PUCCH resources. The method further includes transmitting UCI on the selected PUCCH resource.

A method for a base station is also described. The method includes sending a first higher layer configuration indicating multiple sets of PUCCH resources, the multiple sets of PUCCH resources including at least a short PUCCH resource. The method also includes selecting a PUCCH resource from the sets of PUCCH resources. The method further includes receiving UCI on the selected PUCCH resource.

Another UE is described. The UE includes a processor and memory in electronic communication with the processor. Instructions stored in the memory are executable to determine the uplink control channel (PUCCH) format and configuration based on a signaling from a gNB. The instructions are also executable to determine the control channel used for uplink control information (UCI) feedback. The instructions are further executable to determine the resource of the control channel for UCI feedback. The instructions are additionally executable to transmit UCI on the selected channel.

Determining the PUCCH format and configuration may include at least a short PUCCH format and a long PUCCH format. The short PUCCH format and long PUCCH format may have the same or different waveforms and/or numerologies.

A short PUCCH may be a 1-symbol short PUCCH. The 1-symbol short PUCCH may employ a cyclic prefix Orthogonal Frequency Division Multiplexing (CP-OFDM) waveform. A format may consist of a number of resource blocks (RBs), a reference symbol (RS) pattern, and/or orthogonal sequences on RS and UCI carrying symbols, and/or one or more control resource regions, and/or resource mapping methods, and/or multiple resources for transmit diversity.

The RS pattern of different UEs may be multiplexed with an orthogonal sequence or in a frequency division multiplexing (FDM) manner. The UCI carrying symbols of different UEs may be multiplexed with different orthogonal sequences on UCI carrying symbols. The number of orthogonal sequences or the number of RS patterns for UE multiplexing may be the same as the number of orthogonal sequences applied on UCI carrying symbols.

A short PUCCH may be a 2-symbol short PUCCH. The 2-symbol short PUCCH may employ a discrete Fourier transform spread OFDM (DFT-S-OFDM) waveform. A format may consist of a number of RBs, a RS location, and/or orthogonal sequences on RS and data symbols, and/or one or more control resource regions, and/or resource mapping methods, and/or multiple resources for transmit diversity. The 2-symbol short PUCCH may employ CP-OFDM waveform. A format may consist of a number of RBs, a RS pattern and location, and/or orthogonal sequences on RS and data symbols, and/or one or more control resource regions.

The RS location may be the first symbol of the 2-symbol short PUCCH. The RS location may be determined by the symbol index of a 2-symbol short PUCCH. The RS location of the 2-symbol short PUCCH may be indicated by gNB signaling.

At least for a frequency band over 6 GHz, a UE may be configured with a set of symbols for a short PUCCH, and a short PUCCH is transmitted by selecting one symbol for a 1-symbol PUCCH and 2 symbols for a 2-symbol PUCCH within the set. The 2 symbols selected for the 2-symbol PUCCH within the set may be contiguous or separated within the set. The symbol(s) may be selected based on a gNB indication.

Determining the PUCCH format may include a localized or distributed resource mapping in one or more PUCCH region/subbands.

Determining the uplink control channel (PUCCH) resource for UCI reporting may be done by combination of semi-static RRC configuration and dynamic downlink control information (DCI) indication. The semi-static RRC configuration and dynamic DCI indication may include signaling for HARQ-ACK timing and PUCCH resources.

Another base station (gNB) is also described. The gNB includes a processor and memory in electronic communication with the processor. Instructions stored in the memory are executable to determine an uplink control channel (PUCCH) format and configuration. The instructions are also executable to receive UCI on a selected channel. A control channel used for uplink control information (UCI) feedback and a resource of the control channel for UCI feedback are determined by a UE based on signaling from the gNB.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. A new radio base station may be referred to as a gNB. A gNB may also be more generally referred to as a base station device.

In 5G NR, at least two different types of uplink control channel (PUCCH) formats may be specified: at least one short PUCCH format and one long PUCCH format. The PUCCH channel is designed to carry uplink control information (UCI). In NR, multiple short PUCCH formats may be defined, and the PUCCH format of a UE may be configured by a base station.

In NR, several PUCCH formats will be specified. For UCI, different UCI may be reported on different PUCCH channel formats. In 5G NR, both CP-OFDM and DFT-S-OFDM waveforms are supported for UL transmission. Also, different numerologies may be used on one or more carriers or serving cells. Detailed mapping methods and signaling required for the short PUCCH formats in NR are described. In short PUCCH designs, the lengths of 1 symbol and 2 symbols are considered. However, detailed reference symbol and control information mapping are not defined yet. Furthermore, methods to configure a PUCCH resource are not discussed yet. A PUCCH resource can be allocated at RB level in contiguous or distributed manner. The configuration of PUCCH resources can be semi-statically configured by RRC signaling, and can be dynamically indicated by a DCI. The contents and division between RRC signaling and DCI should be studied further.

The systems and methods described herein detail formats for short PUCCH design. In particular, the RS patterns, the RS location and configurations for a short PUCCH are described herein. Furthermore, details on resource mapping of a short PUCCH, and methods to indicate a short PUCCH resource are provided herein.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for short physical uplink control channel (PUCCH) design for 5th generation (5G) new radio (NR) may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH and a PUSCH, etc.

The one or more gNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE short PUCCH module 126.

The UE short PUCCH module 126 may implement a short PUCCH design for 5th generation (5G) new radio (NR). Uplink control information and uplink waveform in NR are described. In LTE, the UCI carries hybrid-ARQ acknowledgements (HARQ-ACK), channel state information (CSI), and a scheduling request (SR). The CSI may include one or more of channel quality indicator (CQI), rank indication (RI), precoding matrix indicator (PMI), precoding type indicator (PTI), etc. Multiple dimensions of CSI may be reported from one or more cells to support FD-MIMO and CoMP operations.

Similarly, in NR, a scheduling request (SR), if defined, needs to be transmitted outside PUSCH, as well as HARQ-ACK for latency reasons. The CSI report in NR should be enhanced to support massive MIMO and beamforming methods. Thus, multiple sets of CSI may be reported in NR. Again, a CSI feedback may include one or more of CQI, RI, PMI, PTI, beam index, etc. At least two types of CSI reports may be supported, periodic CSI and aperiodic CSI. Periodic CSI report can be configured semi-statically. Aperiodic CSI can be trigger with a CSI request from the gNB 160.

Therefore, physical uplink control signaling should be able to carry at least hybrid-ARQ acknowledgements, CSI reports (possibly including beamforming information), and scheduling requests.

The UCI information may be transmitted as L1/L2 control signaling (e.g., via a physical uplink control channel (PUCCH) or physical uplink share channel (PUSCH) or uplink data channel). Furthermore, it should be possible to dynamically indicate (at least in combination with Radio Resource Control (RRC)) the timing between data reception and hybrid-ARQ acknowledgement transmission as part of the Downlink Control Information (DCI).

In NR, different numerologies are supported on the same or different carriers. For the uplink transmission supports two waveform/modulation schemes based on Orthogonal Frequency Division Multiplexing (OFDM). One waveform/modulation scheme is cyclic prefix OFDM (CP-OFDM). Another waveform/modulation scheme is discrete Fourier transform (DFT) spread OFDM (DFT-S-OFDM), also known as single carrier FDMA (SC-FDMA), or low Peak-to-Average Power Ratio (PAPR) waveform. Therefore, the uplink control and uplink data channel may be configured separately with the same or different waveforms and numerologies.

LTE and 5G NR physical uplink control channel (PUCCH) are also discussed herein. In LTE, the PUCCH with normal Transmission Time Interval (TTI) length occupies a full subframe and 1 resource block (RB) for format 1/2/3/5, and more than one RB is supported for Format 4. Different formats are used to carry different number of UCI payload sizes. Frequency hopping is supported for all 1 ms TTI PUCCH formats by transmitting two slots in two ends of the carrier frequency. The UE multiplexing capability is performed in the frequency domain and/or time domain depending on the PUCCH format.

Format 1/1a/1b has 3 RS symbols in each slot. Zadoff-Chu (Z-C) sequence is used on frequency domain, orthogonal sequences are used for PUCCH spreading in time domain, $N_{SF}^{PUCCH}=4$ for normal CP, $N_{SF}^{PUCCH}=3$ for extended CP.

Format 2/2a/2b has two RS symbols in each slot. It uses Z-C sequences on frequency domain for UE multiplexing, no time domain multiplexing.

Format 3 has two RS symbols in each slot, it only uses time domain multiplexing with orthogonal sequences ($N_{SF}^{PUCCH}=5$ for normal CP and $N_{SF}^{PUCCH}=4$ for extended CP) and no frequency domain multiplexing.

Format 4 may occupy one or more RBs. It carries coded information bits on all data carrying symbols. Thus, it provides largest payload size, but does not support multiplexing for multiple UEs 102 in the same RB.

Format 5 uses only one RB, It has the same structure as Format 4 except that a spreading factor of 2 $N_{SF}^{PUCCH}=2$ is supported, thus two UEs 102 can be multiplexed on the same RB resources.

Similar to different PUCCH formats in LTE, at least two transmission durations are supported for uplink control in NR. One short transmission duration around the last OFDM symbol in a slot may be supported for uplink control in NR. This short transmission duration may be time division multiplexed (TDM) or frequency division multiplexed (FDM) with data. One long transmission duration spanning multiple symbols (e.g. filling most of a slot or slots) may be frequency division multiplexed (FDM) with data.

A short PUCCH format may consist of one or two symbols. A long PUCCH format may span multiple symbols and slots. Multiple long PUCCH formats may be defined (e.g., 4 symbols, a slot, and multiple slots, etc.). A long PUCCH format may be useful for larger payload HARQ-ACK feedback, CSI feedback, etc.

At least a low PAPR/CM design should be supported for the long PUCCH format. A UCI carried by long duration UL control channel at least with low PAPR design can be transmitted in one slot or multiple slots, and transmission across multiple slots should allow a total duration of 1 ms at least for some cases.

For PUCCH format configuration, a combination of semi-static configuration and (at least for some types of UCI information) dynamic signaling is used to determine the PUCCH formats and resources both for the long and short PUCCH formats. The short PUCCH design is described more fully herein.

A short PUCCH format may occupy only 1 symbol length. In this case, CP-OFDM modulation should be used, the reference symbols and UCI carrying symbols can be multiplexed in different subcarriers of a PUCCH resource, as shown in FIG. 13(a) for an FDM case. In case of DFT-S-OFDM waveform, a 1 symbol short uplink control channel can be implemented by sequence based message (i.e., No RS is multiplexed in the symbol). The number of orthogonal sequences limits the UE multiplexing capability and payload sizes. For example, if the LTE Zadoff-Chu sequence is used as the spreading sequence in an RB, a total of 12 cyclic shifts are possible. If 2 bits can be reported by a short PUCCH, up to 3 UEs 102 can be multiplexed on a single RB.

It should be noted that the sequence based 1 symbol short uplink control channel design can also be applied to CP-OFDM waveform. However, the UCI/RS multiplexing provides better flexibility for resource scheduling (e.g., different RS patterns) may be defined to provide different RS overhead and multiplexing capabilities; and orthogonal sequences can be applied in time domain or frequency domain for UCI multiplexing among different UEs 102.

A short PUCCH format may occupy two symbols. In this case, both CP-OFDM and DFT-S-OFDM modulation can be used. In case of DFT-S-OFDM, reference symbol and the UCI carrying symbol can be TDM multiplexed, as shown in FIG. 13(b) for a TDM case.

A short PUCCH may occupy 1 symbol of reference numerology by splitting it into 2 symbols with a higher numerology (i.e., double the subcarrier spacing and reduce the symbol length by half), as shown in FIG. 13(c) for a TDM with symbol splitting case. This 1-symbol design is actually a 2-symbol design with a higher numerology, and the same design as 2-symbol PUCCH can be used.

Furthermore, in order to support TDM of short PUCCH from different UEs 102 in the same slot, a mechanism to tell the UE 102 in which symbol(s) in a slot to transmit the short PUCCH on is supported at least above 6 GHz. The OFDM symbols for the short uplink control channel may not be limited to the last 1 or 2 symbols in a slot. In other words, the earlier symbols and/or the symbols at the beginning of a slot may also be signaled as the uplink control channel.

The 1-symbol short PUCCH formats are described herein. A short PUCCH is suitable for a small number of HARQ-ACK bits and/or SR. For a small UCI payload, the channel coding method of UCI carried on a short uplink control channel, polar code may not be used, and repetition/spreading code and/or linear block code can be used. Even within short PUCCH, different payload sizes may be supported, and multiple formats or configurations may be supported. Several approaches are considered to carry UCI on a 1-symbol PUCCH.

One approach may be a sequence-based PUCCH. In this approach, no RS is used, and PUCCH is transmitted based on sequences. Each sequence may indicate one state. For sequence-based 1-symbol PUCCH, both DFT-S-OFDM and CP-OFDM may be used. Especially, if DFT-S-OFDM is used, the LTE Zadoff-Chu sequence may be reused to achieve UE multiplexing and UCI payload.

The UE multiplexing capability may be limited by the total number of orthogonal sequences. For example, if LTE length 12 Z-C sequences are used as the sequence, there are 12 orthogonal sequences available by cyclic shift. Thus, different UE multiplexing and UCI payload may be supported by different sequence set allocations. If 1 bit of UCI is reported, each UE 102 may be assigned with two sequences, thus an RB can be multiplexed by up to 6 different UEs 102. If 2 bits of UCI are reported, each UE 102 may be assigned with four sequences, thus an RB can be multiplexed by up to 3 different UEs 102.

Furthermore, a short PUCCH may occupy multiple RBs especially if UE multiplexing is supported. In this case, the orthogonal sequence can be designed based on the total number of REs. That is, the orthogonal sequences applied to RS can be determined based on the total number of RS symbols allocated for the PUCCH resource; and the orthogonal sequences applied to UCI carrying symbols can be determined based on the total number of UCI carrying symbols allocated for the PUCCH resource. Thus, different UE multiplexing capability and UCI payload sizes can be supported accordingly.

For a 1-symbol short PUCCH, both continuous and distributed resource allocation may be supported. The PUCCH resource allocation may be performed in the RB level. In one method, a short PUCCH resource can be configured localized in contiguous RBs in a PUCCH region/subband. In another method, a short PUCCH resource can be configured in a distributed manner with non-contiguous RBs in a PUCCH region/subband. In this case, a PUCCH resource pattern should be configured with a PUCCH region/subband for a given UE 102. If a single PUCCH region/subband is configured, the size and the position of the PUCCH region/subband can be configured.

Figure 14:
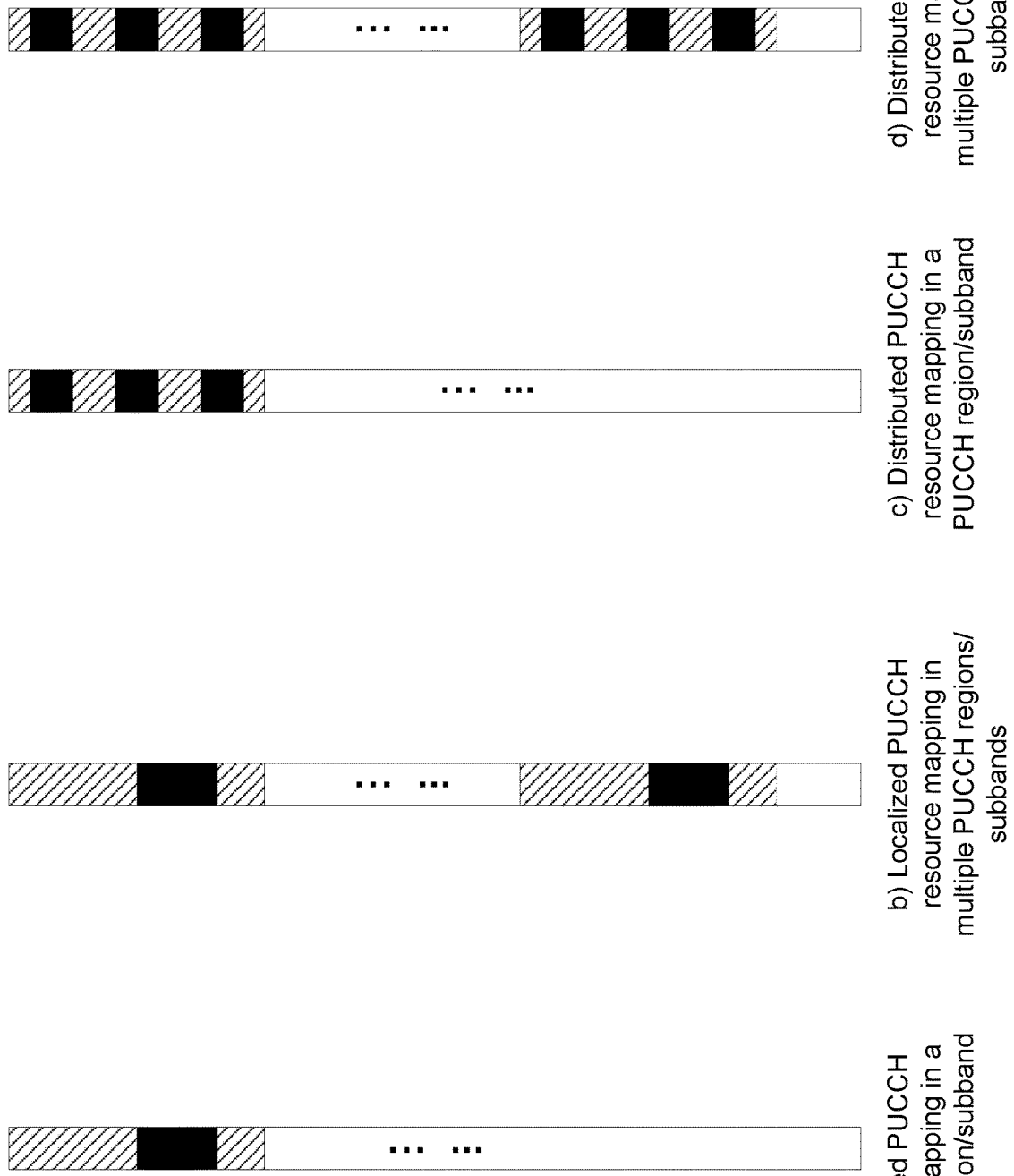
FIG. 14 illustrates examples of 1-symbol PUCCH resource mapping.

To provide frequency diversity, separate PUCCH regions or subbands should be configured for a UE 102, and the PUCCH can be transmitted simultaneously in multiple regions/subbands. The multiple PUCCH regions or subbands can also be viewed as a distributed resource allocation for a short PUCCH. Especially, in a transmission in unlicensed spectrum, a distributed resource mapping is important to satisfy the regulatory requirements. In the case where multiple PUCCH regions/subbands are configured, the size of each PUCCH region/subband can be configured, and the positions of PUCCH regions/subbands can be configured with a pattern within the carrier. FIG. 14 provides several examples of PUCCH resources mapping for 1 symbol short PUCCH with one or more PUCCH regions/subbands and localized/distributed resource mapping methods.

Similarly, a UE 102 can be configured with two PUCCH resources to provide transmit diversity. The two PUCCH resources can be configured in a single PUCCH region/subband, or different PUCCH regions/subbands. The PUCCH resources can be localized with contiguous RB allocations or distributed manner with non-contiguous RB allocations.

To summarize, for a sequence based 1-symbol short PUCCH, one or more of the following parameters should be specified: the number of RBs in a PUCCH region/subband; the orthogonal sequence set of the PUCCH resource; the orthogonal sequence subset assign to the given UE 102; the frequency diversity with multiple PUCCH regions/subbands; transmit diversity with two configured PUCCH resources; the location of one or more configured PUCCH regions/subbands including size and position of each PUCCH subband/region in the carrier; and the localized or distributed resource allocation for a PUCCH resource in a PUCCH region/subband.

Another approach to carry UCI on a 1-symbol PUCCH is an RS and UCI multiplexing-based PUCCH. In this approach UCI and RS multiplexing can be used. In this case, CP-OFDM modulation should be used for 1-symbol PUCCH. The reference symbols (RS) and UCI carrying symbols can be multiplexed in different subcarriers of a PUCCH resource. The RS and UCI multiplexing is more flexible to support different UE multiplexing capabilities and UCI sizes.

Figure 15:
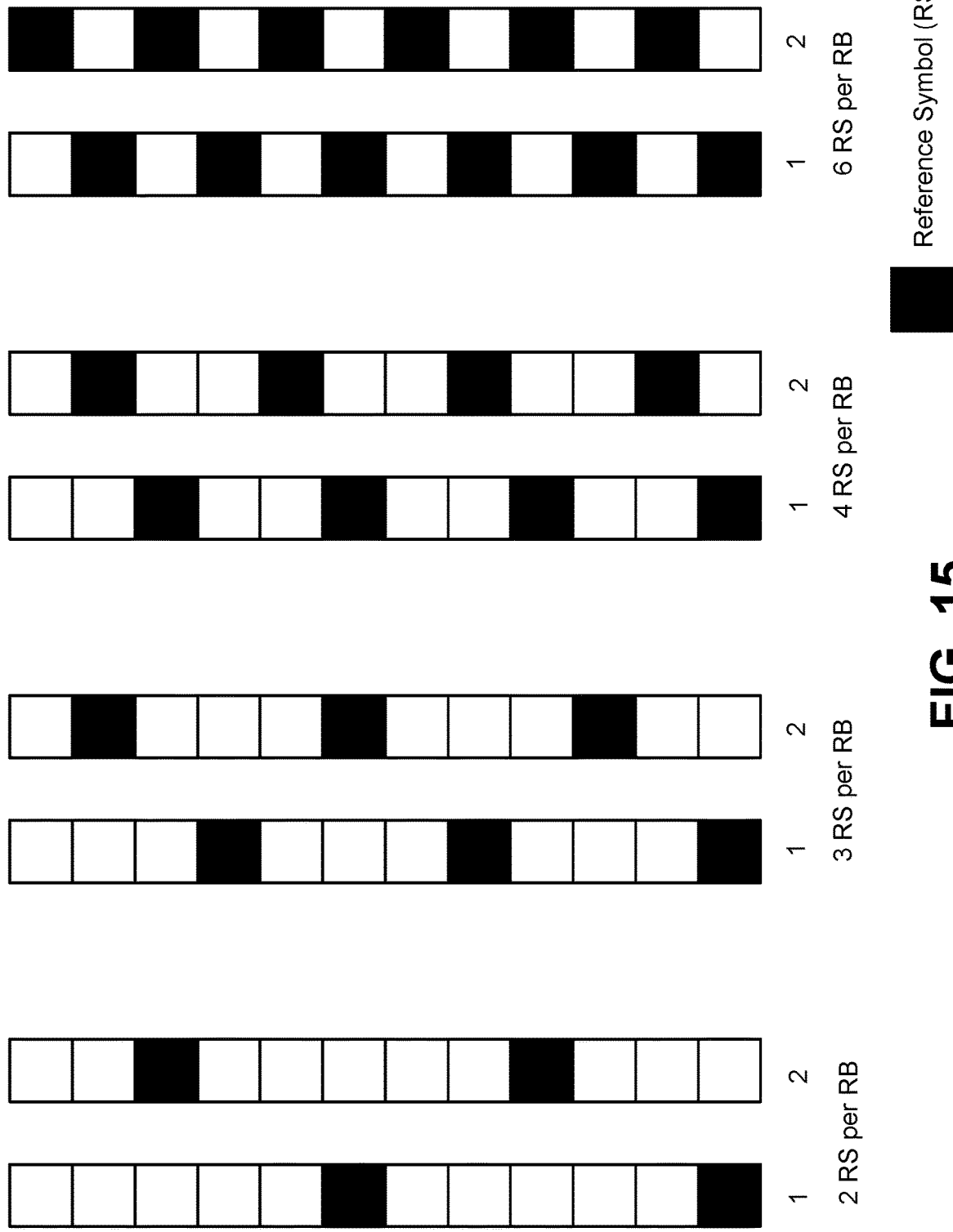
FIG. 15 illustrates examples of reference symbol (RS) patterns for PUCCH in an Orthogonal Frequency Division Multiplexing (OFDM) symbol.

RS pattern design is described herein. Several designs can be considered for reference signals/symbols location and information bit mapping. Some examples include 2 RS in each RB, 3 RS in each RB, 4 RS in each RB, and 6 RS in each RB. FIG. 15 shows the reference signal pattern designs. For each RS setting, at least two patterns can be defined, denoted as pattern 1 and pattern 2 without loss of generality.

The number of RS in each RB is a tradeoff between the DMRS reliability, the multiplexing capability and UCI payload size. A higher number of RS provides better demodulation accuracy and UE multiplexing capability, but reduces the number of symbols for UCI payload, which, thus, supports a lower payload size.

Multiplexing capabilities for an RS and UCI multiplexing-based PUCCH are also described herein. For a short PUCCH, in one method, UE multiplexing is not supported. FDM may be used for different UEs 102 so that the short PUCCH resources of different UEs 102 do not overlap with each other. However, this kind of dedicated resource for each UE 102 causes waste of resources since PUCCH is not always transmitted.

In another approach, UE multiplexing for PUCCH is supported to share the same RB resources for different UEs 102. To separate the signals from different UEs 102 multiplexed on the same RB, some orthogonal code should be applied on the RS and/or UCI data symbols. Several examples of orthogonal sequences with different spreading factors are listed in Tables 1-3 below. Table 1 is for a spreading factor of 2. Table 2 is for a spreading factor of 3. Table 3 is for a spreading factor of 4.

TABLE 1

| Orthogonal sequence index $n_{oc}$ | Orthogonal sequences |
| --- | --- |
| 0 | [+1 +1] |
| 1 | [+1 −1] |

TABLE 2

| Orthogonal sequence index $n_{oc}$ | Orthogonal sequences |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

TABLE 3

| Orthogonal sequence index $n_{oc}$ | Orthogonal sequences |
| --- | --- |
| 0 | [+1 +1 +1 +1] |
| 1 | [+1 −1 +1 −1] |
| 2 | [+1 +1 −1 −1] |
| 3 | [+1 −1 −1 +1] |

Furthermore, a short PUCCH may occupy multiple RBs especially if UE multiplexing is supported. In this case, the orthogonal sequence for RS can be designed based on the total number of RS symbols. For example, the LTE Zadoff-Chu (ZC) sequences and cyclic shifts can be reused for total number of RS has the length of 12 or multiples of 12.

The number of orthogonal sequences applied to RS and UCI data symbols jointly determine the UE multiplexing capability. The total number of UCI data symbols and the spreading factor determines the number of information bits that can be carried on a PUCCH. Thus, many different combinations of RS pattern and spreading factors on RS and UCI carrying symbols can be considered. Each combination may target for a specific maximum UCI bits.

To optimize the multiplexing capabilities, the number of orthogonal sequences applied to the RS symbols should be the same as the number of orthogonal sequences applied to the UCI carrying symbols, which, in turn, determines the number of UCI symbols can be carried in each RB. Table 4 shows a summary of the multiplexing capabilities with a different number of RS symbols in a RB.

TABLE 4

| Number of RS per RB | Maximum number of orthogonal sequences on RS | Maximum number of orthogonal sequences on UCI carrying symbols in a RB | Number of different UCI symbols in a RB |
| --- | --- | --- | --- |
| 2 | 2 | 2 | 5 |
| 3 | 3 | 3 | 3 |
| 4 | 4 | 4 | 2 |
| 6 | 6 | 6 | 1 |

If there are 2 RS symbols per RB, only two orthogonal sequences are available for UE multiplexing. For the RS symbols, the following orthogonal sequences in Table 5 can be used.

TABLE 5

| Orthogonal sequence index $n_{oc}$ | Orthogonal sequences |
| --- | --- |
| 0 | [+1 +1] |
| 1 | [+1 −1] |

For the UCI carrying bits, two orthogonal sequences can be applied on 10 UCI carrying symbols in a RB with the following example orthogonal sequences of Table 6. As a result, each RB can carry 5 different UCI symbols for each UE in each RB.

TABLE 6

| Orthogonal sequence index $n_{oc}$ | Orthogonal sequences |
|---|---|
| 0 | [+1 +1 +1 +1 +1 +1 +1 +1 +1 +1] |
| 1 | [+1 −1 +1 −1 +1 −1 +1 −1 +1 −1] |

If there are 3 RS symbols per RB, three orthogonal sequences are available for UE multiplexing. For the RS symbols, the following orthogonal sequences in Table 7 can be used.

TABLE 7

| Orthogonal sequence index $n_{oc}$ | Orthogonal sequences |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

For the UCI carrying bits, three orthogonal sequences can be applied on 9 UCI carrying symbols in a RB with the following example orthogonal sequences of Table 8. As a result, each RB can carry 3 different UCI symbols for each UE in each RB.

TABLE 8

| Orthogonal sequence index $n_{oc}$ | Orthogonal sequences |
|---|---|
| 0 | [1 1 1 1 1 1 1 1 1] |
| 1 | [1 $e^{j2\pi/3}$ $e^{j4\pi/3}$ 1 $e^{j2\pi/3}$ $e^{j4\pi/3}$ 1 $e^{j2\pi/3}$ $e^{j4\pi/3}$] |
| 2 | [1 $e^{j4\pi/3}$ $e^{j2\pi/3}$ 1 $e^{j4\pi/3}$ $e^{j2\pi/3}$ 1 $e^{j4\pi/3}$ $e^{j2\pi/3}$] |

If there are 4 RS symbols per RB, four orthogonal sequences are available for UE multiplexing. For the RS symbols, the following orthogonal sequences of Table 9 can be used.

TABLE 9

| Orthogonal sequence index $n_{oc}$ | Orthogonal sequences |
|---|---|
| 0 | [+1 +1 +1 +1] |
| 1 | [+1 −1 +1 −1] |
| 2 | [+1 +1 −1 −1] |
| 3 | [+1 −1 −1 +1] |

For the UCI carrying bits, four orthogonal sequences can be applied on 8 UCI carrying symbols in a RB with the following example orthogonal sequences of Table 10. As a result, each RB can carry 2 different UCI symbols for each UE in each RB.

TABLE 10

| Orthogonal sequence index $n_{oc}$ | Orthogonal sequences |
|---|---|
| 0 | [+1 +1 +1 +1 +1 +1 +1 +1] |
| 1 | [+1 −1 +1 −1 +1 −1 +1 −1] |
| 2 | [+1 +1 −1 −1 +1 +1 −1 −1] |
| 3 | [+1 −1 −1 +1 +1 −1 −1 +1] |

If there are 6 RS symbols per RB, six orthogonal sequences are available for UE multiplexing. For the RS symbols, the following orthogonal sequences of Table 11 can be used as an example.

TABLE 11

| Orthogonal sequence index $n_{oc}$ | Orthogonal sequences |
|---|---|
| 0 | [1 1 1 1 1 1] |
| 1 | [1 $e^{j2\pi/3}$ $e^{j4\pi/3}$ 1 $e^{j2\pi/3}$ $e^{j4\pi/3}$] |
| 2 | [1 $e^{j4\pi/3}$ $e^{j2\pi/3}$ 1 $e^{j4\pi/3}$ $e^{j2\pi/3}$] |
| 3 | [1 1 1 −1 −1 −1] |
| 4 | [1 $e^{j2\pi/3}$ $e^{j4\pi/3}$ −1 $e^{j5\pi/3}$ $e^{j\pi/3}$] |
| 5 | [1 $e^{j4\pi/3}$ $e^{j2\pi/3}$ −1 $e^{j\pi/3}$ $e^{j5\pi/3}$] |

For the UCI carrying bits, six orthogonal sequences can be applied on 6 UCI carrying symbols in a RB with the same example orthogonal sequences as for the RS symbols. As a result, each RB can carry 1 UCI symbols for each UE in each RB.

Another method of DMRS pattern multiplexing for different UEs 102 can be achieved by applying different DMRS patterns for different UEs 102. In this case, the UCI data should not be allocated to REs reserved for DMRS of other UEs 102 as well. Thus, there is no interference on the DMRS from other UEs 102. Since different REs are used as DMRS symbols of different UEs 102, no orthogonal sequences are needed on the DMRS symbols. The UCI multiplexing capability should be determined based on the number of UEs multiplexed in the RB on the remaining UCI carrying symbols.

Figure 16:
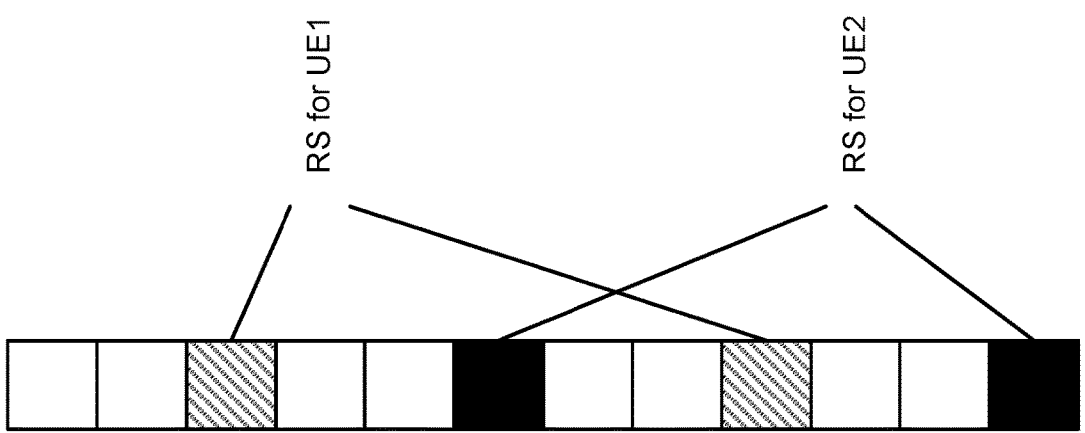
FIG. 16 illustrates an example of demodulation reference signal (DMRS) multiplexing with frequency division multiplexing (FDM) for a 1-symbol short PUCCH.

An example of RS multiplexing of 2 UEs 102 with different RS patterns of 2 DMRS symbols is shown in FIG. 16. Orthogonal sequences can still be applied on the REs carrying coded UCI data. In this example, 2 UEs each uses 2 different REs in a RB as DMRS, and there are 8 UCI carrying symbols in a RB. To multiplexing the UCIs among two UEs, two orthogonal sequences as shown in Table 12 can be applied on 8 UCI carrying symbols. As a result, each UE can transmit 4 different UCI symbols in a RB.

TABLE 12

| Orthogonal sequence index $n_{oc}$ | Orthogonal sequences |
|---|---|
| 0 | [+1 +1 +1 +1 +1 +1 +1 +1] |
| 1 | [+1 −1 +1 −1 +1 −1 +1 −1] |

Figure 17:
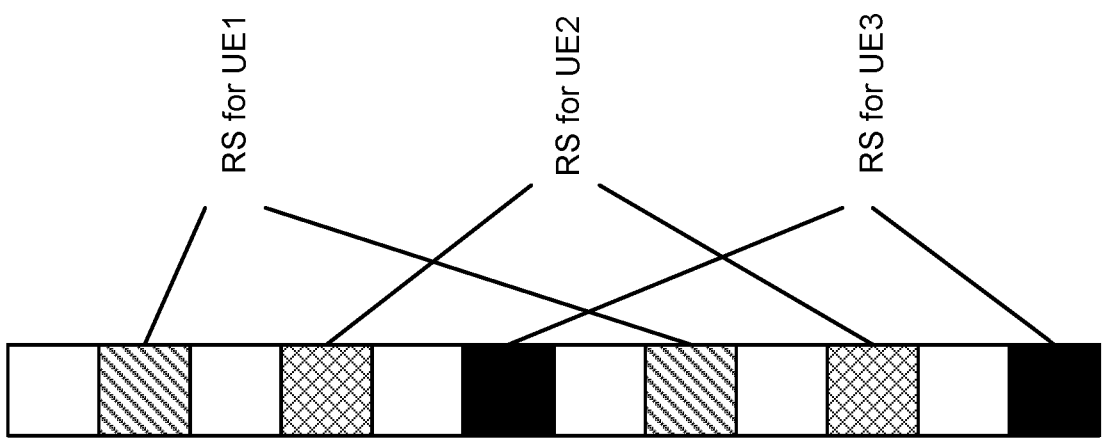
FIG. 17 illustrates another example of RS multiplexing of 3 UEs with different RS patterns of 2 demodulation reference signal (DMRS) symbols.

Another example of RS multiplexing of 3 UEs with different RS patterns of 2 DMRS symbols is shown in FIG. 17. Orthogonal sequences can still be applied on the REs carrying coded UCI data. To multiplex the UCIs among three UEs, three orthogonal sequences as shown in Table 13 can be applied on 6 UCI carrying symbols. As a result, each UE can transmit 2 different UCI symbols in a RB.

TABLE 13

| Orthogonal sequence index $n_{oc}$ | Orthogonal sequences |
|---|---|
| 0 | [1 1 1 1 1 1 1 1] |
| 1 | [1 $e^{j2\pi/3}$ $e^{j4\pi/3}$ 1 $e^{j2\pi/3}$ $e^{j4\pi/3}$ 1 $e^{j2\pi/3}$ $e^{j4\pi/3}$] |
| 2 | [1 $e^{j4\pi/3}$ $e^{j2\pi/3}$ 1 $e^{j4\pi/3}$ $e^{j2\pi/3}$ 1 $e^{j4\pi/3}$ $e^{j2\pi/3}$] |

For a 1-symbol short PUCCH, both continuous and distributed resource allocation should be supported. The PUCCH resource allocation may be performed in RB level. In one method, a short PUCCH resource can be configured localized in contiguous RBs in a PUCCH region/subband. In another method, a short PUCCH resource can be configured in a distributed manner with non-contiguous RBs in a PUCCH region/subband. In this case, a PUCCH resource pattern should be configured with a PUCCH region/subband for a given UE. If a single PUCCH region/subband is configured, the size and the position of the PUCCH region/subband can be configured.

Frequency diversity and transmit diversity support for an RS and UCI multiplexing-based PUCCH are also described herein. To provide frequency diversity, separate PUCCH regions or subbands should be configured for a UE 102, and the PUCCH can be transmitted simultaneously in multiple regions/subbands. The multiple PUCCH regions or subbands can also be viewed as a distributed resource allocation for a short PUCCH. Especially, in a transmission in unlicensed spectrum, a distributed resource mapping is important to satisfy the regulatory requirements. In a case where multiple PUCCH regions/subbands are configured, the size of each PUCCH region/subband can be configured, and the positions of PUCCH regions/subbands can be configured with a pattern within the carrier.

Similarly, a UE 102 can be configured with two PUCCH resources to provide transmit diversity. The two PUCCH resources can be configured in a single PUCCH region/subband, or different PUCCH regions/subbands. The PUCCH resources can be localized with contiguous RB allocations or distributed manner with non-contiguous RB allocations.

As a summary, for a 1-symbol short PUCCH based on RS and UCI multiplexing, the following parameters should be specified: the number of RBs in a PUCCH region/subband; the RS pattern and spreading sequence if applied; the spreading sequence on UCI data symbols if applied; the frequency diversity with multiple PUCCH regions/subbands; transmit diversity with two configured PUCCH resources; the location of one or more configured PUCCH regions/subbands including size and position of each PUCCH subband/region in the carrier; and localized or distributed resource allocation for a PUCCH resource in a PUCCH region/subband.

2-symbol short PUCCH formats are also described herein. For a 2-symbol short PUCCH format in NR, both CP-OFDM and DFT-S-OFDM can be used. However, it may be more appropriate to use DFT-S-OFDM based short PUCCH for its lower PAPR properties.

DFT-S-OFDM based 2-symbol short PUCCH are described herein. In the case of a DFT-S-OFDM waveform, the RS pattern and UCI information bit can be multiplexed in TDM manner (i.e., one symbol is used to carry DMRS; the other symbol is used for coded UCI information bits). LTE Zadoff-Chu (ZC) sequences and cyclic shifts can be reused for the DMRS pattern. For the RS and information bit multiplexing, several methods can be considered for the mapping.

Figure 18:
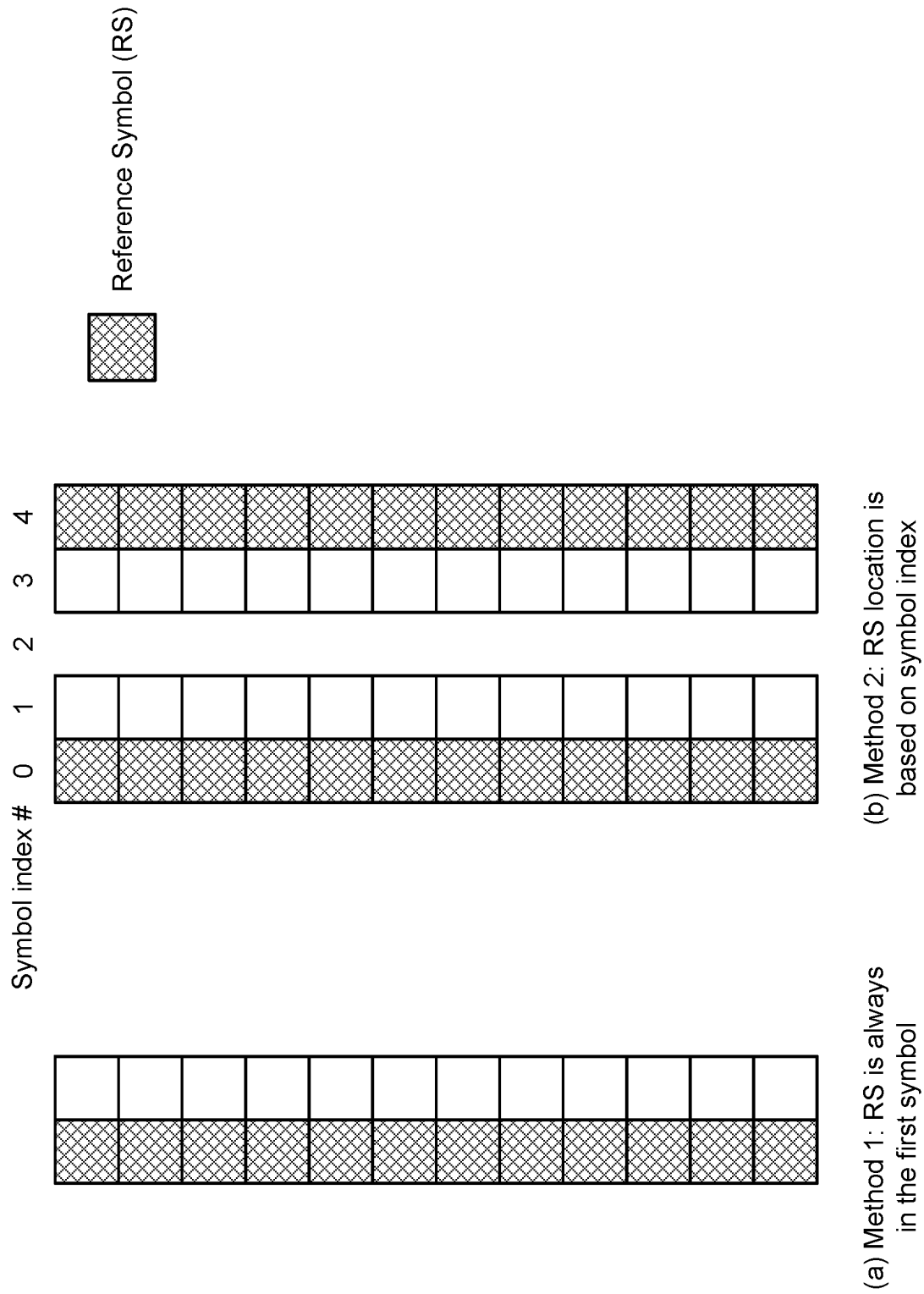
FIG. 18 illustrates an example of RS location in a 2-symbol short PUCCH with a discrete Fourier transform spread OFDM (DFT-S-OFDM)

In a first method, the first symbol is always DMRS, and the second symbol is always for UCI data. The DMRS is transmitted first so that the base station (gNB 160) can decode earlier compared with a post-loaded DMRS, as shown in FIG. 18(*a*). However, if different UEs 102 start short PUCCH at different symbols, the DMRS pattern of one UE 102 may collide with the UCI data part of another UE 102. This may cause interference to the Z-C sequence used for DMRS. To avoid such problems, with a fixed DMRS location, a 2-symbol short PUCCH can be configured to always start from odd symbol indexes or even symbol indexes.

In a second method, to avoid interference due to RS misalignment among UEs 102, the location of the DMRS may be fixed in certain symbol locations. For example, in FIG. 18(*b*), a symbol with odd symbol index is used for DMRS, a symbol with even symbol index is used for UCI data, or vice versa. Therefore, depending on the starting symbol of a 2-symbol short PUCCH, the DMRS location may be in the first symbol of second symbol of a 2-symbol PUCCH.

In a third method, the RS location is changeable or configurable. The RS location within a 2-symbol PUCCH can be semi-statically configured by higher layer signaling for a given UE 102. The RS location within a 2-symbol PUCCH can be dynamically indicated by a DCI. The adjustable RS location can be used to avoid interference due to RS misalignment among different UEs 102.

Furthermore, a short PUCCH may occupy multiple RBs especially if UE multiplexing is supported. The orthogonal sequences applied to RS can be determined based on the total number of RS symbols allocated for the PUCCH resource. The orthogonal sequences applied to UCI carrying symbols can be determined based on the total number of UCI carrying symbols allocated for the PUCCH resource. The number of orthogonal sequences applied to RS and UCI data symbols jointly determine the UE multiplexing capability. The total number of UCI data symbols and the spreading factor determines the number of information bits that can be carried on a PUCCH. Thus, many different combinations of RS pattern and spreading factors on RS and UCI carrying symbols can be considered. Each combination may target for a specific maximum UCI bits.

For a 2-symbol short PUCCH, both continuous and distributed resource allocation should be supported. The PUCCH resource allocation may be performed in RB level. In one method, a short PUCCH resource can be configured localized in contiguous RBs in a PUCCH region/subband. In another method, a short PUCCH resource can be configured in a distributed manner with non-contiguous RBs in a PUCCH region/subband. In this case, a PUCCH resource pattern should be configured with a PUCCH region/subband for a given UE. If a single PUCCH region/subband is configured, the size and the position of the PUCCH region/subband can be configured.

To provide frequency diversity, frequency hopping of a 2-symbol short PUCCH can be configured. In this case, separate PUCCH regions or subbands should be configured for a UE 102, and the PUCCH can be transmitted simultaneously in multiple regions/subbands. The multiple PUCCH regions or subbands can also be viewed as a distributed resource allocation for a short PUCCH. Especially, in a transmission in unlicensed spectrum, a distributed resource mapping is important to satisfy the regulatory requirements. In a case where multiple PUCCH regions/subbands are configured, the size of each PUCCH region/subband can be configured, and the positions of PUCCH regions/subbands can be configured with a pattern within the carrier.

Several examples of PUCCH resources mapping for 2 symbol short PUCCH with one or more PUCCH regions/subbands and localized/distributed resource mapping methods are provided in FIG. 19.

Similarly, a UE 102 can be configured with two PUCCH resources to provide transmit diversity. The two PUCCH resources can be configured in a single PUCCH region/subband, or different PUCCH regions/subbands. The PUCCH resources can be localized with contiguous RB allocations or distributed manner with non-contiguous RB allocations.

If frequency diversity is supported for a DFT-S-OFDM based 2-symbol short PUCCH different approaches may be used for DMRS location. In one approach, the DMRS location of the PUCCH transmission in different PUCCH regions or subbands can be switched (i.e., if the RS is located in the first symbol in a first PUCCH region, the RS should be located in the second symbol in the second PUCCH region for frequency diversity). In another approach, the DMRS location of the PUCCH transmission in different PUCCH regions or subbands can be the same.

A CP-OFDM based 2-symbol short PUCCH is also described herein. In the case of a CP-OFDM waveform, the RS pattern in a symbol can be based on the RS pattern defined for 1-symbol PUCCH above. Thus, a 2-symbol short PUCCH uses 1-symbol short PUCCH structure and repeats in a duration of 2 symbols. Several methods can be considered for the RS and UCI symbol multiplexing.

In a first method (Method 1), RS is located in the first symbol only. Front load RS has the advantage of fast decoding. With RS in the first symbol only also reduces the RS overhead, and more REs can be used to carry coded UCI symbols. However, this may result in different number of UCI carrying REs on two symbols. Thus, orthogonal sequences with different lengths have to be used on different symbols to achieve the same UE multiplexing capabilities. Within this method, several approaches can be used to determine the RS pattern.

In one approach, a fixed RS pattern in always applied. For example, in FIG. 20(a) with 3 RS in a RB, pattern 1 is always applied. In another approach, the RS pattern is determined based on the symbol index of the starting symbol. For example, in FIG. 20(b) with 3 RS in a RB, pattern 1 is used if the starting symbol has an even index number, and pattern 2 is used if the starting symbol has an odd index number, or vice versa. In yet another approach, the RS pattern can be changeable or configurable. The RS pattern can be semi-statically configured by higher layer signaling or dynamically indicated by a DCI for a given UE 102.

In a second method (Method 2), RS is located in both symbols. RS in both symbols provides better demodulation accuracy. Furthermore, this method may simplify the design by reusing the RS and UCI multiplexing methods for 1-symbol PUCCH design, and repeat in both symbols. Within this method, several approaches can be used to determine the RS pattern.

In one approach, the same pattern is applied to both symbols, as shown in FIG. 21(a). The RS pattern can be fixed, or semi-statically configured by higher layer signaling, or dynamically indicated by a DCI for a given UE 102. In another approach, different RS patterns are used in different symbols, as in FIG. 21(b). An interlaced pattern is used in different symbols. An interlaced DMRS pattern in two symbols provides better DMRS distribution and demodulation accuracy than the same RS location in both symbols. The RS pattern on a symbol may be configured semi-statically. The RS pattern on a symbol may be indicated by a based station via a DCI. The RS pattern may be determined based on the symbol index of the given symbol (e.g., pattern 1 is used for symbol with even index number, and pattern 2 is used for symbol with odd index number, or vice versa).

In a third method (Method 3), the RS location is changeable or configurable. With this method, the RS is only available in one symbol. But the RS may be in the first symbol or the second symbol of a 2-symbol short PUCCH. The RS location within a 2-symbol PUCCH can be semi-statically configured by higher layer signaling for a given UE 102. The RS location within a 2-symbol PUCCH can be dynamically indicated by a DCI. The same approaches as in Method 1 can be applied to Method 3 for the RS pattern selection on the RS carrying symbol.

Furthermore, a short PUCCH may occupy multiple RBs especially if UE multiplexing is supported. The orthogonal sequences applied to RS can be determined based on the total number of RS symbols allocated for the PUCCH resource; and the orthogonal sequences applied to UCI carrying symbols can be determined based on the total number of UCI carrying symbols allocated for the PUCCH resource. The number of orthogonal sequences applied to RS and UCI data symbols jointly determine the UE multiplexing capability. The total number of UCI data symbols and the spreading factor determines the number of information bits that can be carried on a PUCCH. Thus, many different combinations of RS pattern and spreading factors on RS and UCI carrying symbols can be considered. Each combination may target for a specific maximum UCI bits.

Figure 22:
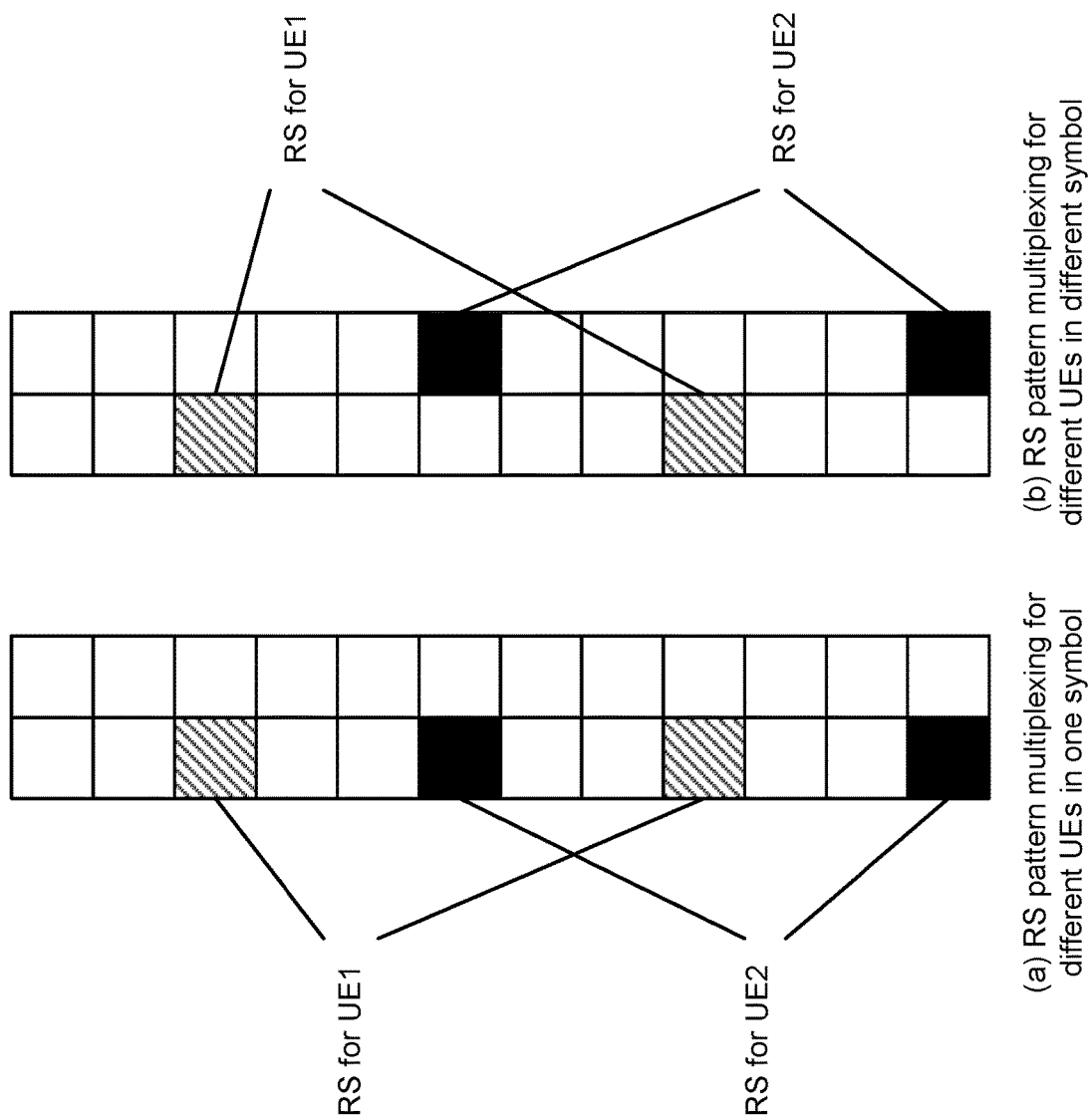
FIG. 22 illustrates examples of RS multiplexing of two UEs with different RS patterns.

Another method of DMRS pattern multiplexing for different UEs 102 can be achieved by applying different DMRS patterns for different UEs 102. In this case, the UCI data should not be allocated to REs reserved for DMRS of other UEs 102 as well. Thus, there is no interference on the DMRS from other UEs 102. FIG. 22 shows an example of RS multiplexing of 2 UEs 102 with different RS patterns. Orthogonal sequences can still be applied on the REs carrying coded UCI data. The RS multiplexing of different UEs may be allocated in the same symbol as in FIG. 22(a), or in different symbols as in FIG. 22(b). Especially for RS multiplexing in different symbols as shown in FIG. 22(b), the same UCI multiplexing methods as in 1 symbol PUCCH can be reused on each symbol.

To provide frequency diversity, frequency hopping of a 2-symbol short PUCCH can be configured. In this case, separate PUCCH regions or subbands should be configured for a UE 102, and the PUCCH can be transmitted simultaneously in multiple regions/subbands.

If frequency diversity is supported for a CP-OFDM based 2-symbol short PUCCH, and if DMRS is present in only one symbol, different approaches may be used for DMRS location. In one approach, the DMRS location of the PUCCH transmission in different PUCCH regions or subbands can be switched (i.e., if the RS is located in the first symbol in a first PUCCH region, the RS should be located in the second symbol in the second PUCCH region for frequency diversity). In another approach, the DMRS location of the PUCCH transmission in different PUCCH regions or subbands can be the same.

If frequency diversity is supported for a CP-OFDM based 2-symbol short PUCCH, and if DMRS is present in both symbols, different approaches may be used for DMRS location. In one approach, 2-symbol PUCCH structures are used in each PUCCH region/subband. In another approach, a 2-symbol PUCCH can spread into multiple 1-symbol PUCCH structures in two symbols (i.e., 1-symbol PUCCH structure is used in each PUCCH region/subband), and the location of the symbols is switched between PUCCH regions/subbands.

Similarly, a UE 102 can be configured with two PUCCH resources to provide transmit diversity. The two PUCCH resources can be configured in a single PUCCH region/subband, or different PUCCH regions/subbands. The PUCCH resources can be localized with contiguous RB allocations or distributed manner with non-contiguous RB allocations.

As a summary, for a 2-symbol short PUCCH resource, one or more of the following parameters should be specified:

the waveform (e.g., CP-OFDM or DFT-S-OFDM); the number of RBs in a PUCCH region/subband; the RS pattern and spreading sequence if applied; the RS location; the spreading sequence on UCI data symbols if applied; the frequency diversity with multiple PUCCH regions/subbands; transmit diversity with two configured PUCCH resources; the location of one or more configured PUCCH regions/subbands including size and position of each PUCCH subband/region in the carrier; and localized or distributed resource allocation for a PUCCH resource in a PUCCH region/subband.

Configuration of a short PUCCH is also described herein. In LTE, multiple PUCCH formats are defined for different maximum payload sizes. Similarly in NR, multiple short PUCCH formats should be configured for different maximum payload sizes. Even if short PUCCH is designed for HARQ-ACK and SR only, the payload sizes may be different for different use cases. For example, ultra-reliable low latency communication (URLLC) traffic may need only 1 bit of HARQ-ACK, but feedback for eMBB traffic may require more HARQ-ACK bits. Thus, tradeoffs between RS, information bits and multiplexing capabilities should be considered.

Furthermore, for a given PUCCH format, the resource allocation can be more flexible than LTE depending on the channel conditions. For UEs 102 with very good signal condition, fewer RB resources may be allocated for a PUCCH. For UEs 102 with bad signal conditions (e.g., cell edge UEs 102), more RB resources may be allocated for a PUCCH.

Therefore, for a short PUCCH, at least the following parameters may be configured for a given UE 102 to determine the PUCCH format: the number of symbols for the PUCCH; the waveform (e.g., CP-OFDM or DFT-S-OFDM); the number of RBs in a PUCCH region/subband; the RS pattern and spreading sequence in a RB or a symbol if applied; the RS location for 2-symbol PUCCH; the spreading sequence on UCI data carrying symbols if applied; the frequency diversity with multiple PUCCH regions/subbands; transmit diversity with two configured PUCCH resources; the location of one or more configured PUCCH regions/subbands including size and position of each PUCCH subband/region in the carrier; and localized or distributed resource allocation for a PUCCH resource in a PUCCH region/subband.

To determine a short PUCCH resource, besides the above mentioned parameters, more information should be signaled, including the starting symbol index in a slot; the RB index of the starting RB of a PUCCH resource; and the RB pattern for distributed resource mapping.

In order to reduce the signaling overhead, a list of supported short uplink control channel formats can be specified, each with a given set of parameters, and the name or index of a support short PUCCH format is indicated or configured to a UE 102.

Moreover, the 5G NR supports different frequency bands with different channel characteristics. Thus, the PUCCH behavior may be different for different frequency bands. For below 6 GHz frequency bands, the channel condition is more stable. Thus, it is better to use a semi-static configured PUCCH resource, or a dynamic indicated PUCCH resource. For frequency band above 6 GHz, beamforming technology is critical for the operation. Considering beam sweeping, a UE 102 may use different beams in different symbols.

Therefore, for a frequency band above 6 GHz, a one symbol short PUCCH may be configured with multiple symbols. Each symbol may use the same or different beams from other symbols. The UE 102 may transmit PUCCH in one of the symbols among the configured symbols, as shown in FIG. 23(*a*).

For a frequency band above 6 GHz, a two symbol short PUCCH may be configured with multiple symbols. The UE 102 may transmit PUCCH in two of the symbols among the configured symbols. In one approach, a 2-symbol short PUCCH can be transmitted in any two consecutive symbols within the configured PUCCH symbols, as shown in FIG. 23(*b*). In another approach, a 2-symbol short PUCCH can be transmitted in any two symbols within the configured PUCCH symbols, as shown in FIG. 23(*c*).

If a CP-OFDM waveform is used for a 2-symbol short PUCCH, the beam in one symbol may be the same or different from the other symbol. Thus, it is better to have DMRS in both 2 symbols. If a DFT-S-OFDM waveform is used for a 2-symbol short PUCCH, the beam of two symbols in the short PUCCH should be the same. Also, if DFT-S-OFDM waveform is used for a 2-symbol short PUCCH, it may be better to use consecutive 2 symbols with the same beam.

For both 1-symbol and 2-symbol short PUCCH above the 6 GHz frequency band, in one method, the gNB 160 may indicate which symbols and/or beams should be used for short PUCCH transmission by dynamic signaling via DCI. In another method, the UE 102 may choose the symbols and/or beams for the short PUCCH transmission.

To determine the short PUCCH resource, 5G NR requires more configurations. At least one of the following aspects may be supported in NR.

In a first aspect, a short PUCCH format and/or resource for a UE 102 can be semi-statically configured by higher layer signaling. If a UE 102 is not configured for a short PUCCH format and/or resource by higher layer signaling, the UE 102 may use a long PUCCH format. If a UE 102 is configured for a short PUCCH format and/or resource by higher layer signaling, the UE 102 may use a short PUCCH format. Alternatively, if a UE 102 is not configured with a long PUCCH format and/or resource by higher layer signaling, the UE 102 may use a short PUCCH format. If a UE 102 is configured with a long PUCCH format and/or resource by higher layer signaling, the UE 102 may use a long PUCCH format.

In another aspect, a short PUCCH format and/or resource for a UE 102 can be dynamically indicated by physical layer signaling (e.g., a DCI). The DCI format may have an n-bit information field indicating the PUCCH format irrespective of RRC configuration. Alternatively, the DCI format may have the n-bit information field if the UE 102 is configured with some configuration (e.g., a configuration of short PUCCH format, a configuration of a certain transmission mode/scheme, a configuration of License-assisted-access (LAA) cell, etc.) by higher layer signaling, and the DCI format may not have the n-bit information field otherwise. The DCI formats related to system information, paging and/or random access response may not have the n-bit information field, and the other DCI formats (e.g., DCI formats related to user-specific payload) may have the n-bit information field.

In another aspect, a short PUCCH format and/or resource for a UE 102 can be adaptively determined based on the UCI types and/or the number of UCI bits. If UCI types are HARQ-ACK or SR only, a short PUCCH format may be used. A short PUCCH format may be used if the UCI payload is smaller or equal to a threshold (e.g., 4 bits or 8 bits). Different short PUCCH configurations may be used for different payload sizes. A long PUCCH format may be used if the UCI payload size is greater than the threshold.

In another aspect, a short PUCCH format and/or resource for a UE 102 can be adaptively determined based on the DL transmission mode or DL transmission scheme which may be configured by higher layer signaling.

In yet another aspect, different short PUCCH formats may be configured or utilized for different types of traffic.

The short PUCCH may mainly be used to report HARQ-ACK feedback of DL PDSCH transmissions. The report may be determined by a combination of semi-static and dynamic signaling for the HARQ-ACK timing indication and PUCCH resource indication.

Before RRC configuration, a default HARQ-ACK timing and PUCCH resource should be specified for UE initial access. After RRC connection, a set of HARQ-ACK timing can be configured for a UE 102, and the actual HARQ-ACK timing may be dynamically indicated by a DCI. Similarly, a set of PUCCH resources can be configured for a UE 102, and the actual PUCCH resource to be used for the reporting may be indicated by a DCI.

The PUCCH resource configuration has a tradeoff between semi-static RRC signaling and dynamic DCI indication. In general, the PUCCH format/structure should be configured by RRC signaling, and the actual PUCCH resource to be used for UCI reporting should be determined by explicit DCI indication.

If the HARQ-ACK timing only indicates the slot for a PUCCH reporting, the PUCCH resource indication should include more detailed information such as the symbol index within the slot. In one method, the RRC signaling configures a set of short PUCCH resources with detailed parameters for a UE 102. The parameters include the PUCCH formats, the resource allocation and the symbol index in a slot, etc. And the DCI indicates the short PUCCH index within the RRC configured set of resources. In another method, the PUCCH resources may be indexed based on a RRC configured short PUCCH structure. The indexes may be generated for resources in a PUCCH region spanning over one or more symbols. A UE 102 may be configured with a set of PUCCH resources based on the PUCCH indexes. The DCI indicates the index of a PUCCH resource in a set of PUCCH resources configured for a UE 102. The DCI of HARQ-ACK timing and the DCI for PUCCH resource indication jointly determines the HARQ-ACK feedback location.

If the HARQ-ACK timing indicates the slot and the symbol index within the slot for a PUCCH reporting, the PUCCH resource indication should include only the resource indexes in the given symbol(s) of the given slot. Thus, the PUCCH resources may be indexed based on a RRC configured short PUCCH structure. The indexes may be generated for resources in a PUCCH region spanning over one or two symbols based on the short PUCCH structure. A UE 102 may be configured with a set of PUCCH resources based on the PUCCH indexes. The DCI indicates the index of a PUCCH resource in a set of PUCCH resources configured for a UE 102. In this case, the DCI for HARQ-ACK timing determines the actual reporting timing, and the DCI for PUCCH resource indication determines the PUCCH resources used for the reporting.

PUCCH considerations for ultra-reliable low latency communications (URLLC) are also described herein. For URLLC traffic, several aspects need to be considered for PUCCH design and PUCCH transmissions.

One aspect is HARQ-ACK feedback for a downlink URLLC transmission. URLLC traffic requires ultra-reliability and low latency. The HARQ-ACK for URLLC packet should be supported to provide the required reliability. Furthermore, the HARQ-ACK feedback should be reported immediately after a URLLC transmission. Moreover, the HARQ-ACK feedback should have the same or higher reliability than the URLLC data transmission (i.e., the current PUCCH channel Bit Error Rate (BER) requirements of 1% or 0.1% cannot satisfy the URLLC requirements). The HARQ-ACK BER requirement should be the same as or better than the URLLC data channel (i.e., at least $10^{-5}$ or $10^{-6}$ or even lower).

Thus, the PUCCH format for URLLC DL transmission should also provide ultra-reliability and low latency after a URLLC DL transmission. Only short PUCCH should be used for URLLC HARQ-ACK feedback. The position of short PUCCH can be determined dynamically based on URLLC DL data transmission (e.g., immediately after a URLLC DL transmission with a 1-symbol gap period). The URLLC traffic may be defined with a self-contained slot structure, and PUCCH is reserved at the end of the self-contained slot.

In a design of HARQ-ACK feedback for URLLC, the following aspects can be targeted. URLLC short control channel should be more robust (e.g., BER<$10^{-6}$). Only 1 or 2 HARQ-ACK bits may be supported. Only 1 HARQ process may be supported. For example, multiple RBs may be used for a URLLC control feedback. Frequency diversity and transmit diversity can be applied.

To minimize the delay, one symbol short PUCCH may be used for feedback of a URLLC DL transmission. Furthermore, two symbol short PUCCH may be used for better reliability. If multiplexing of RS and UCI is used, the RS pattern may be different from other PUCCH. For example, 6 RS and 6 data symbols may be in each RB. Longer orthogonal cover code (OCC) code may be used.

A sequence-based short PUCCH may be used. Thus, a UE 102 may be configured with a set of sequences across the configured RB resources for the URLLC short PUCCH. The feedback HARQ-ACK or SR bits may be mapped to different sequences in the set.

URLLC short PUCCH may use a different numerology from other short PUCCH. Specifically, the URLLC PUCCH should have shorter symbol lengths than other short PUCCH or PUSCH transmissions.

Thus, based on these aspects, a short PUCCH for URLLC may be configured with a different set of parameters for a UE 102. The format of a short PUCCH for URLLC traffic may be semi-statically configured by higher layer signaling. The resource and location of short PUCCH may be semi-statically configured or implicitly mapped based on URLLC DL transmission. The short PUCCH for URLLC feedback should be dynamically transmitted based on DL URLLC reception.

As mentioned, URLLC traffic requires ultra-reliability and low latency, and may collide with a PUCCH or PUSCH transmission of the same UE 102. As a general rule, the URLLC traffic should have higher priority than any other UL transmissions. In the case where a short PUCCH transmission collides with a URLLC traffic in the same symbol, the URLLC should have higher priority. Several methods can be considered.

In a first method (Method 1), URLLC is transmitted and the PUCCH in the overlapping symbol is dropped. This is a simple solution and can be applicable in all cases regardless of PUCCH waveforms and/or numerologies. The whole short PUCCH should be dropped for a 1-symbol PUCCH. For a 2-symbol PUCCH, if the URLLC collides with the first symbol of a short PUCCH, all short PUCCH symbols should be dropped. If a 2-symbol short PUCCH transmission already starts, and the URLLC collides with the 2nd symbol in a 2-symbol short PUCCH, the second symbol of the short PUCCH is dropped.

In a second method (Method 2), simultaneous transmission of URLLC and short PUCCH, with power scaling on short PUCCH REs may be performed. If simultaneous transmission of URLLC and PUCCH is supported on the same symbol, UL transmit power should be allocated to the URLLC traffic first. The remaining power can be power scaled on the PUCCH REs in the same UL symbol. In one approach, in the case of overlapping REs between URLLC and PUSCH, the URLLC signals are transmitted and PUCCH symbols on corresponding REs are dropped. In another approach, in the case of overlapping REs between URLLC and PUSCH, the URLLC signals are transmitted and the entire PUCCH symbol should be dropped as in method 1. Note that if URLLC traffic and PUCCH uses different waveforms, simultaneous transmission of URLLC and PUCCH may not be possible. Also, if URLLC traffic and PUCCH uses different numerologies, some guard interval may be required between different numerologies, and simultaneous transmission of URLLC and PUCCH may not be supported in some cases.

The URLLC UL transmission may be scheduled or pre-configured with a resource known to the gNB 160. The gNB 160 may blind decode the URLLC traffic and handle the other channels (e.g., PUCCH and PUSCH based on the specified or configured UE behavior). On the other hand, it is beneficial for a UE 102 to indicate a URLLC UL transmission to the gNB 160. The indication may be a short URLLC PUCCH that is transmitted simultaneously with URLLC PUSCH data. The short URLLC PUCCH resource may be configured semi-statically as an SR resource. The PUCCH format design may be the same as the PUCCH for HARQ-ACK feedback of a DL URLLC transmission.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB short PUCCH module 194. The gNB short PUCCH module 194 may implement a short PUCCH design for 5G NR as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding.

For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
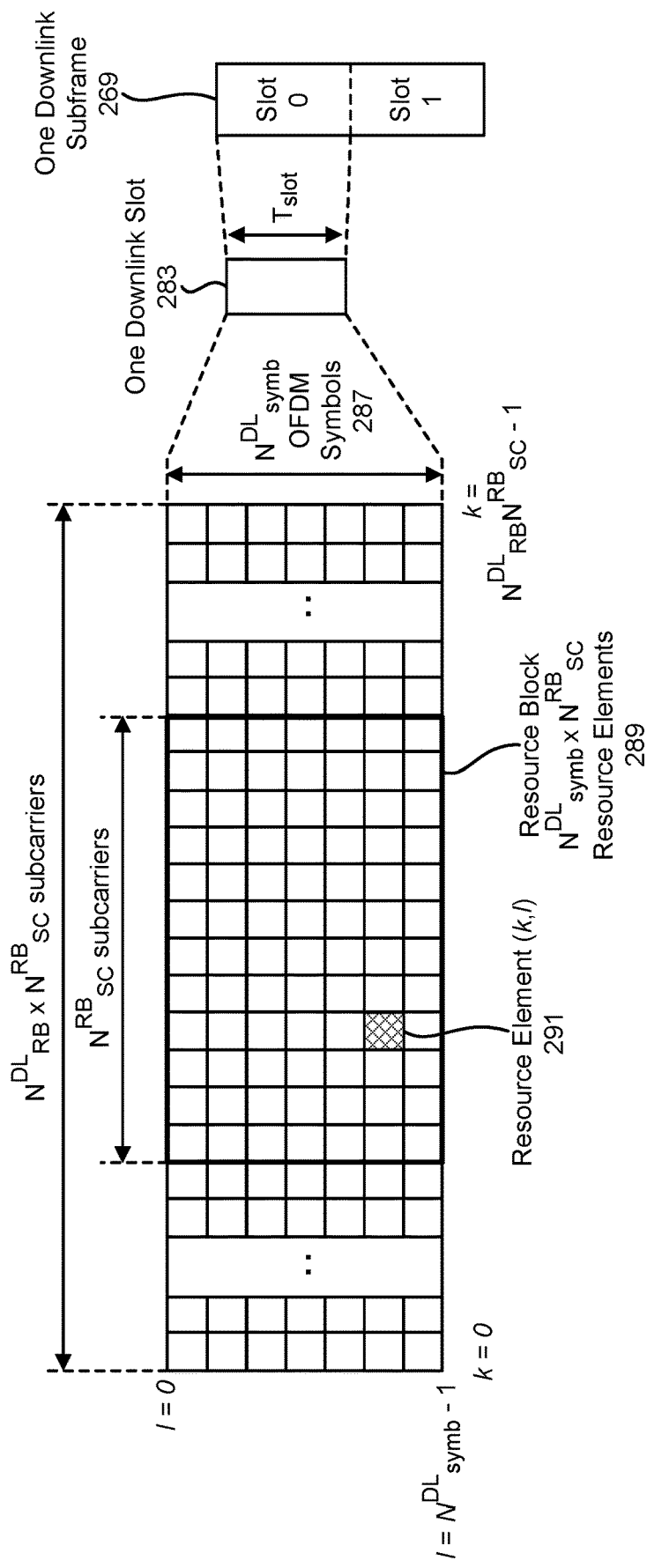
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 291 may be the RE 291 whose index l fulfils l≥$l_{data,start}$ and/or $l_{data,end}$≥l in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k, l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
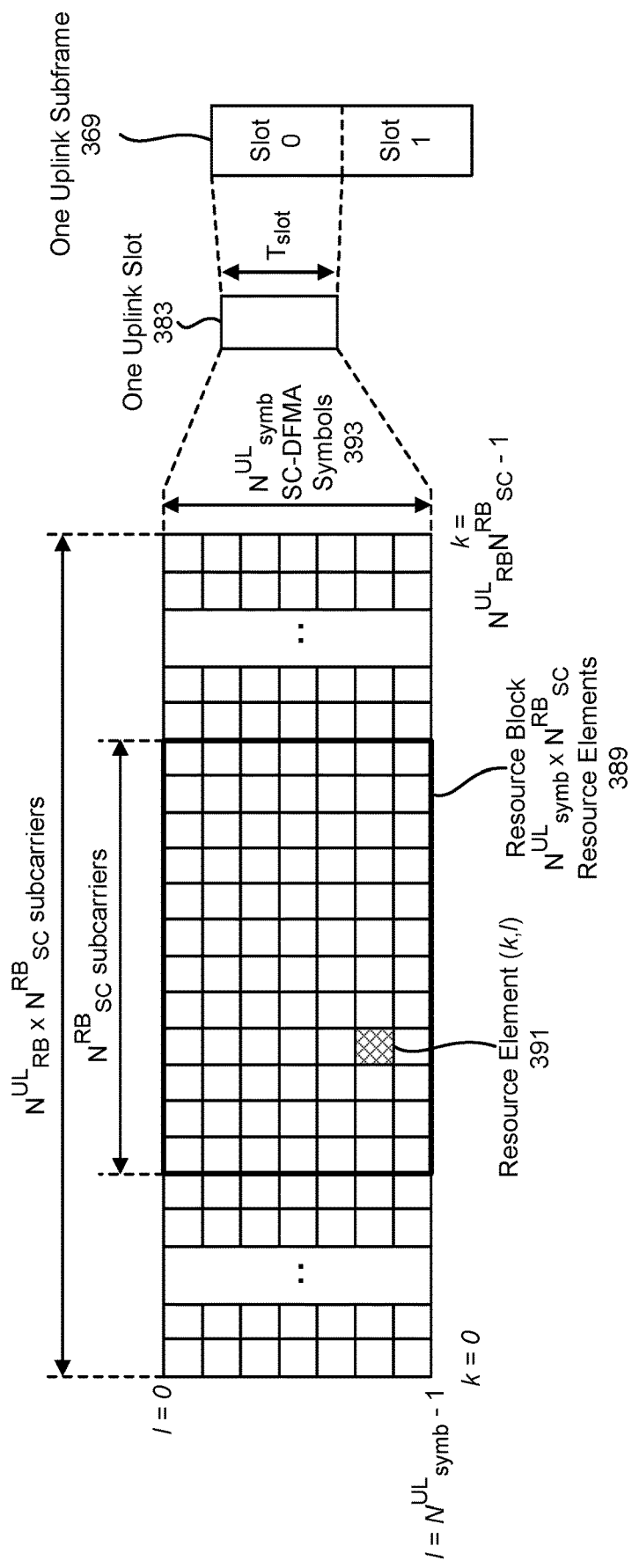
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k, l) in a slot, where k and l are indices in the frequency and time domains respectively. While uplink subframes in one component carrier (CC) are discussed herein, uplink subframes are defined for each CC.

Figure 4:
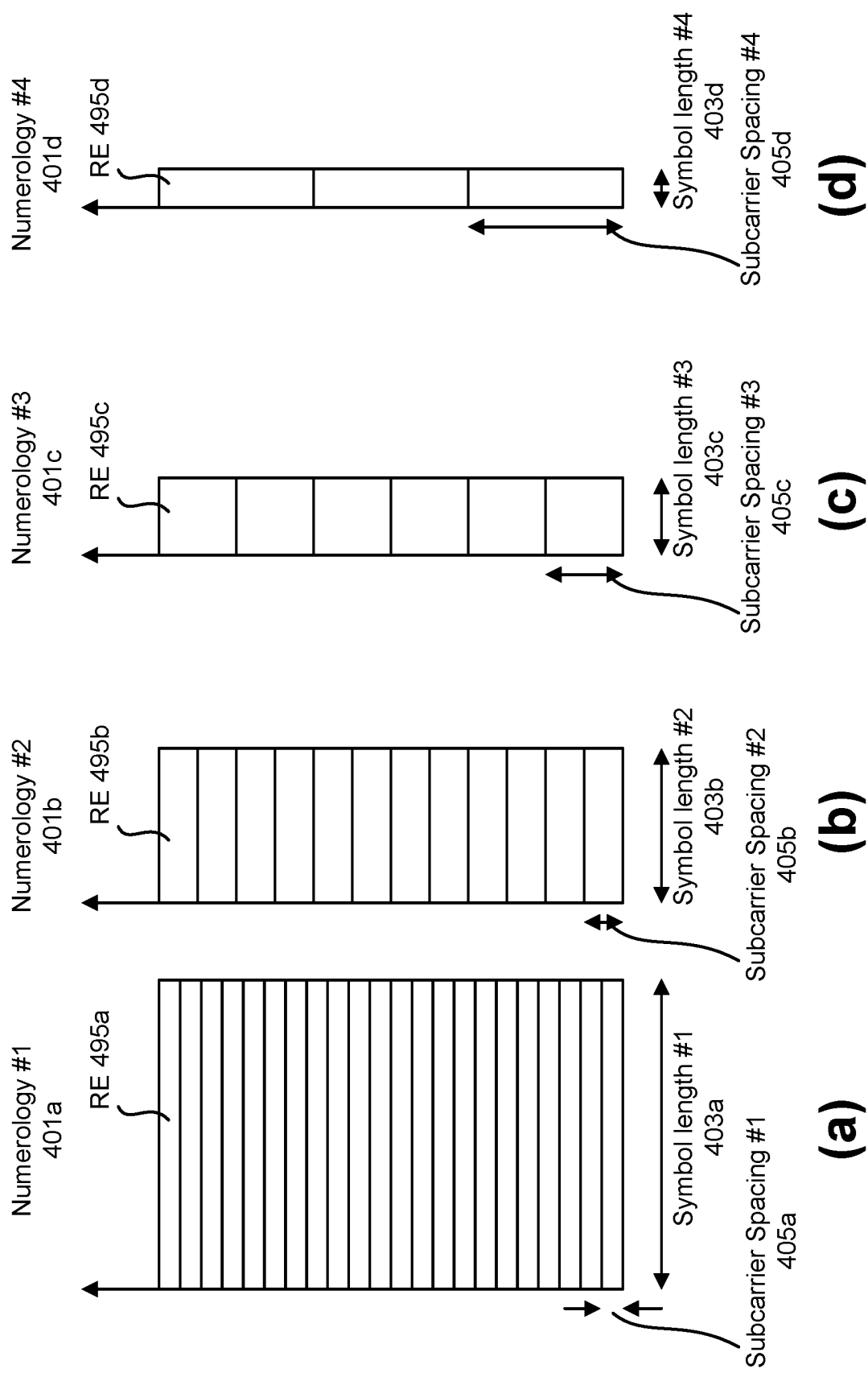
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048Ts+CP length (e.g., 160Ts or 144Ts) in time domain (i.e., symbol length #403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}$ *Ts +CP length (e.g., $160*2^{-i}$ *Ts or $144*2^{-i}$ *Ts). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

Figure 5:
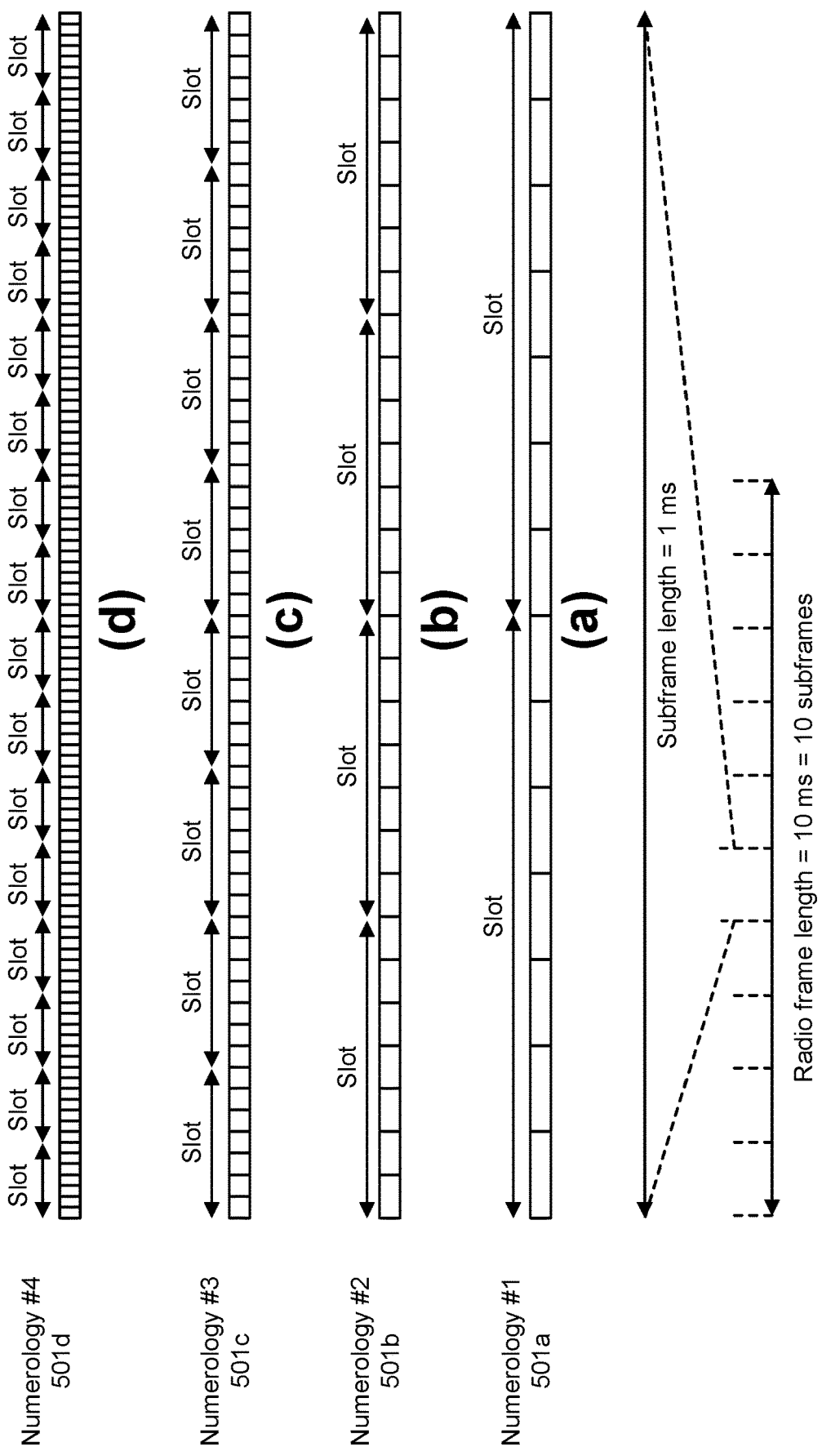
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
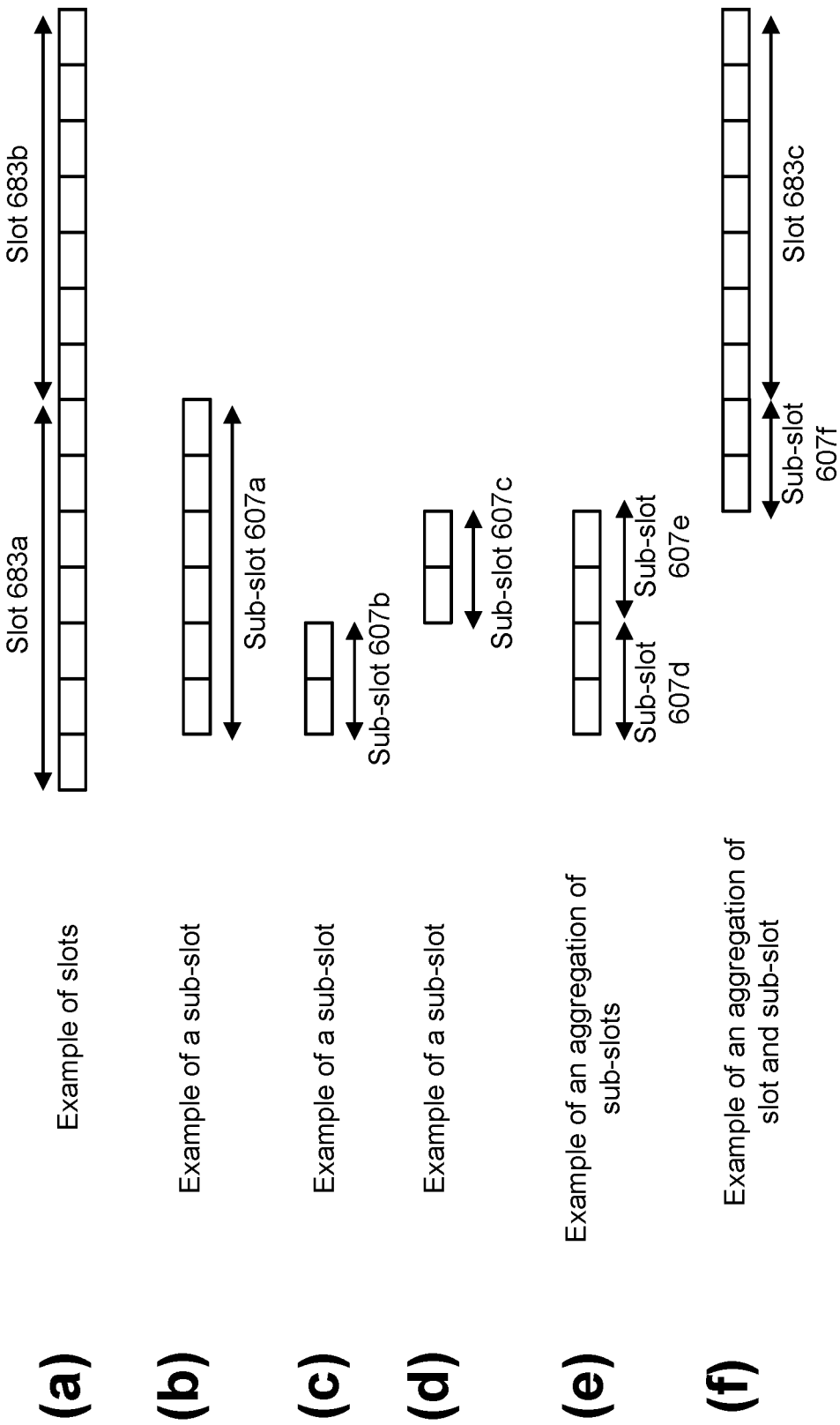
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
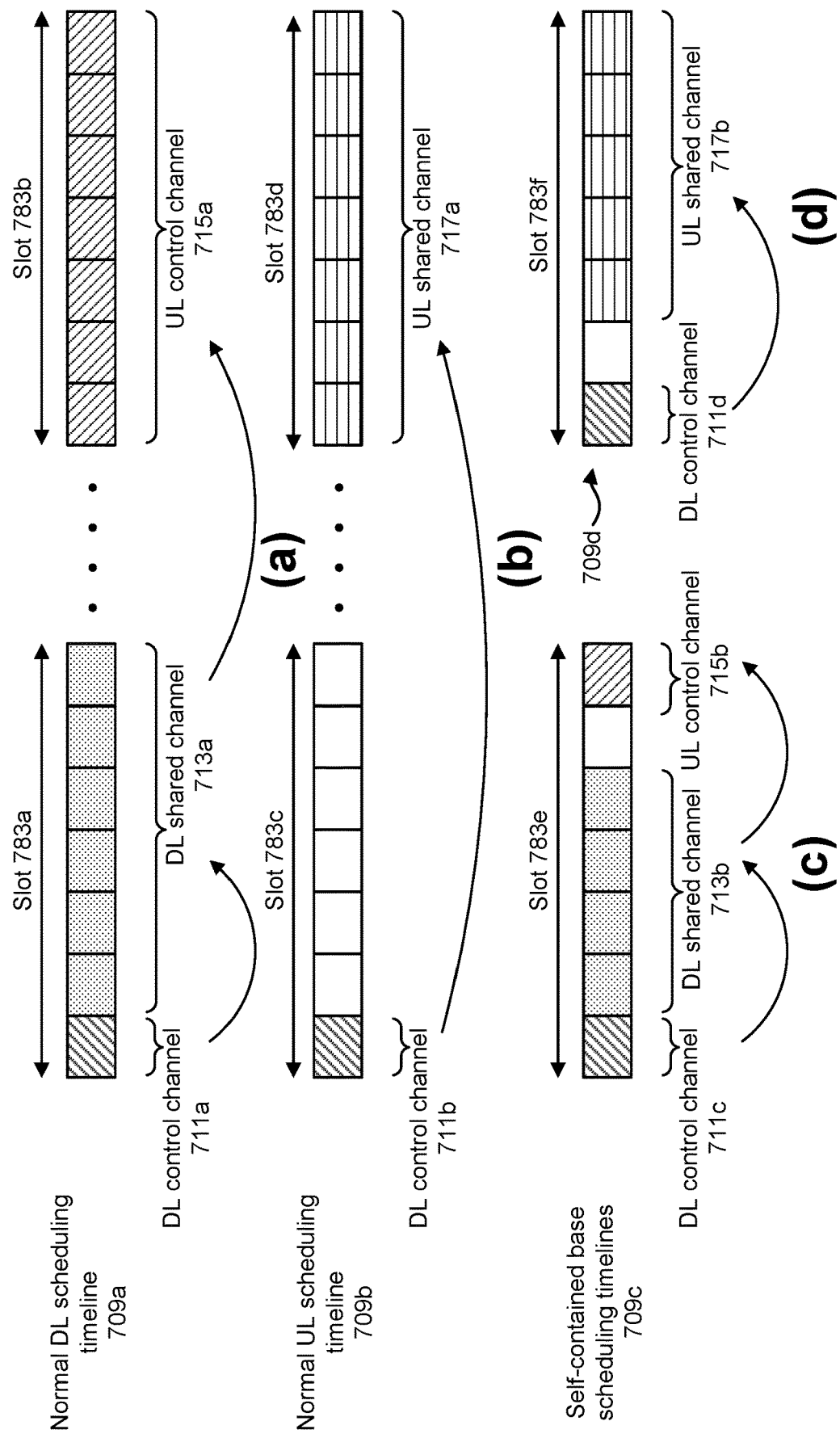
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DMRS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
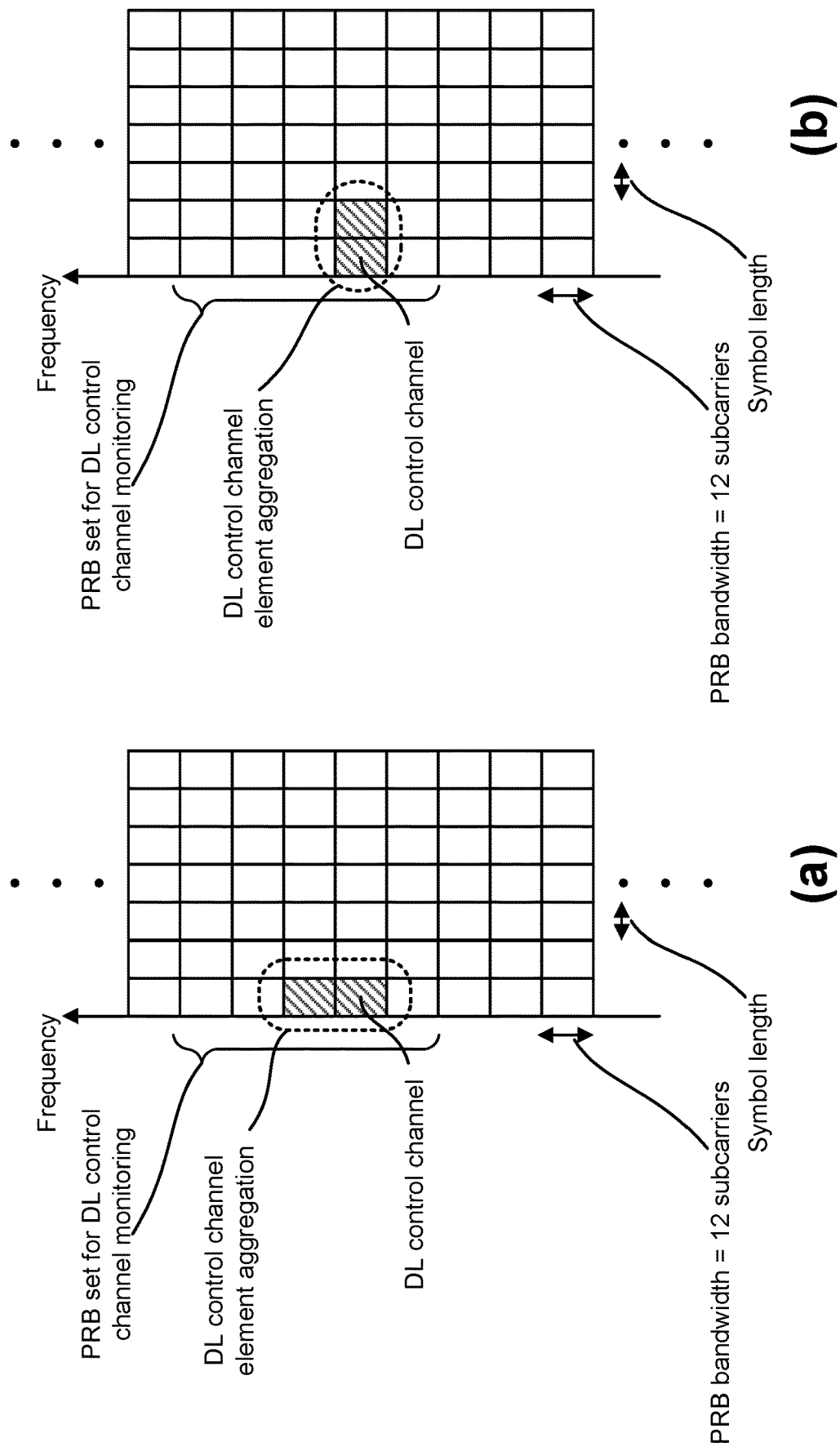
FIG. 9 shows examples of DL control channel which consists of more than one control channel elements.

FIG. 9 shows examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
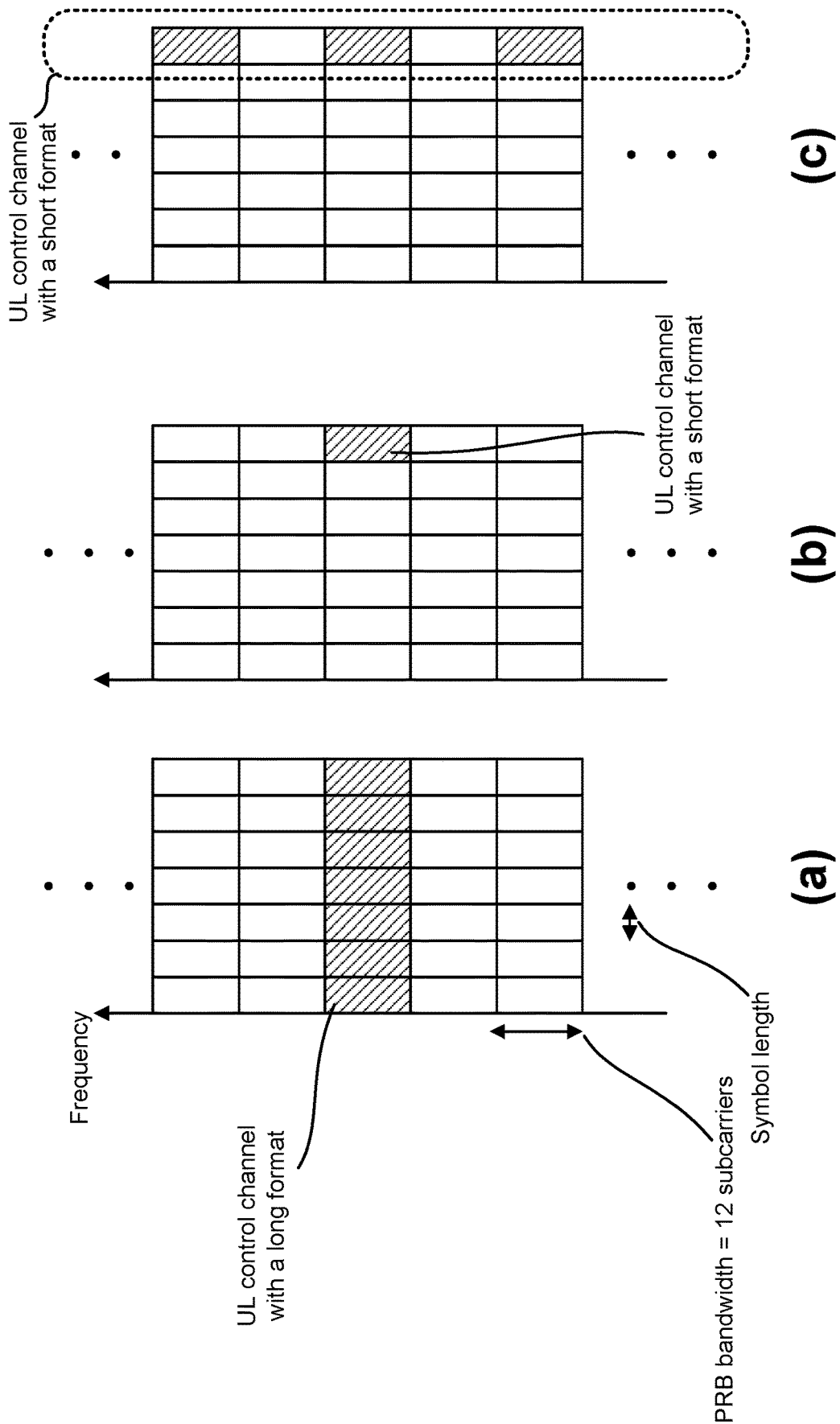
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 11:
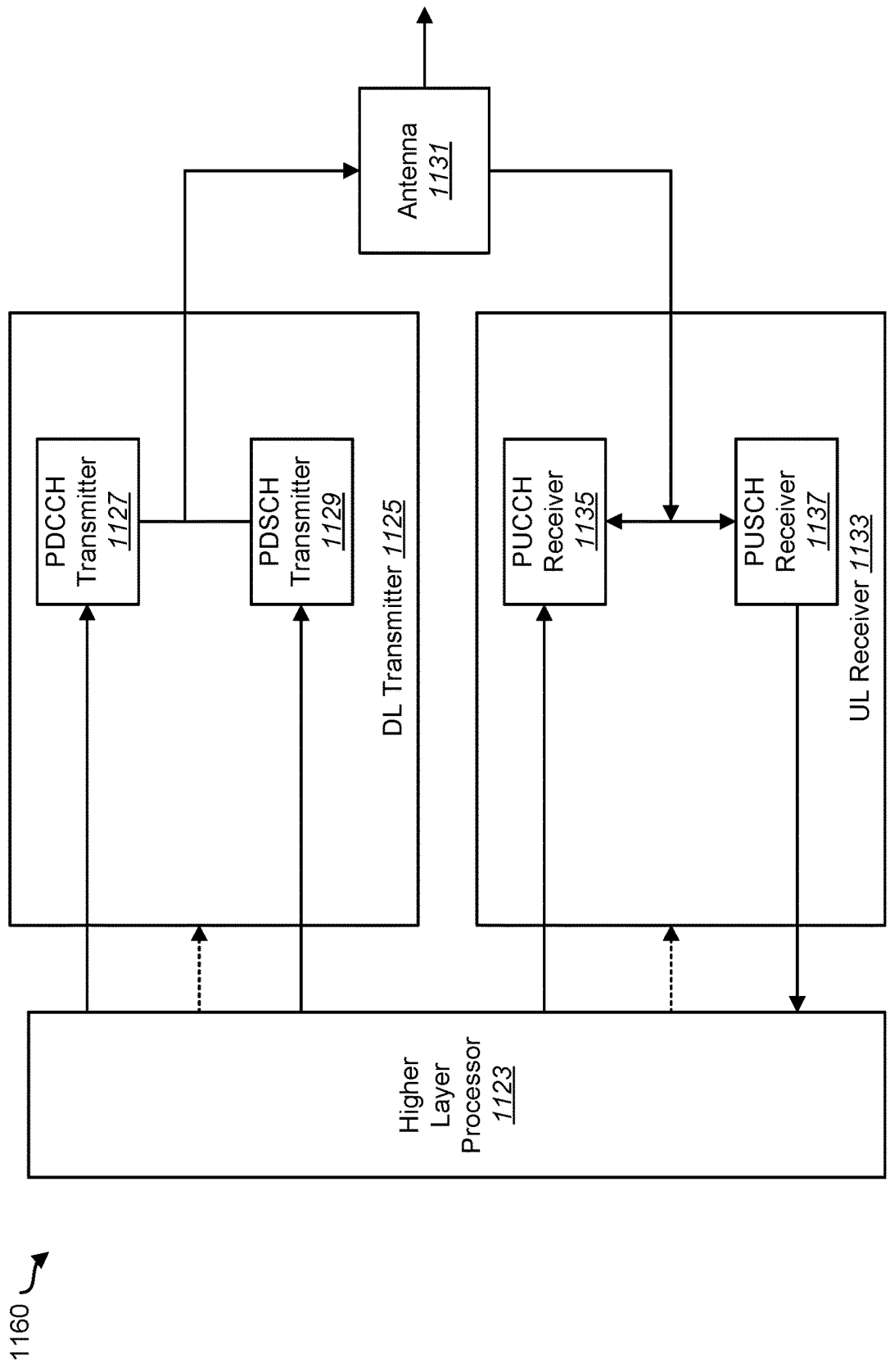
FIG. 11 is a block diagram illustrating one implementation of a gNB.

FIG. 11 is a block diagram illustrating one implementation of an gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
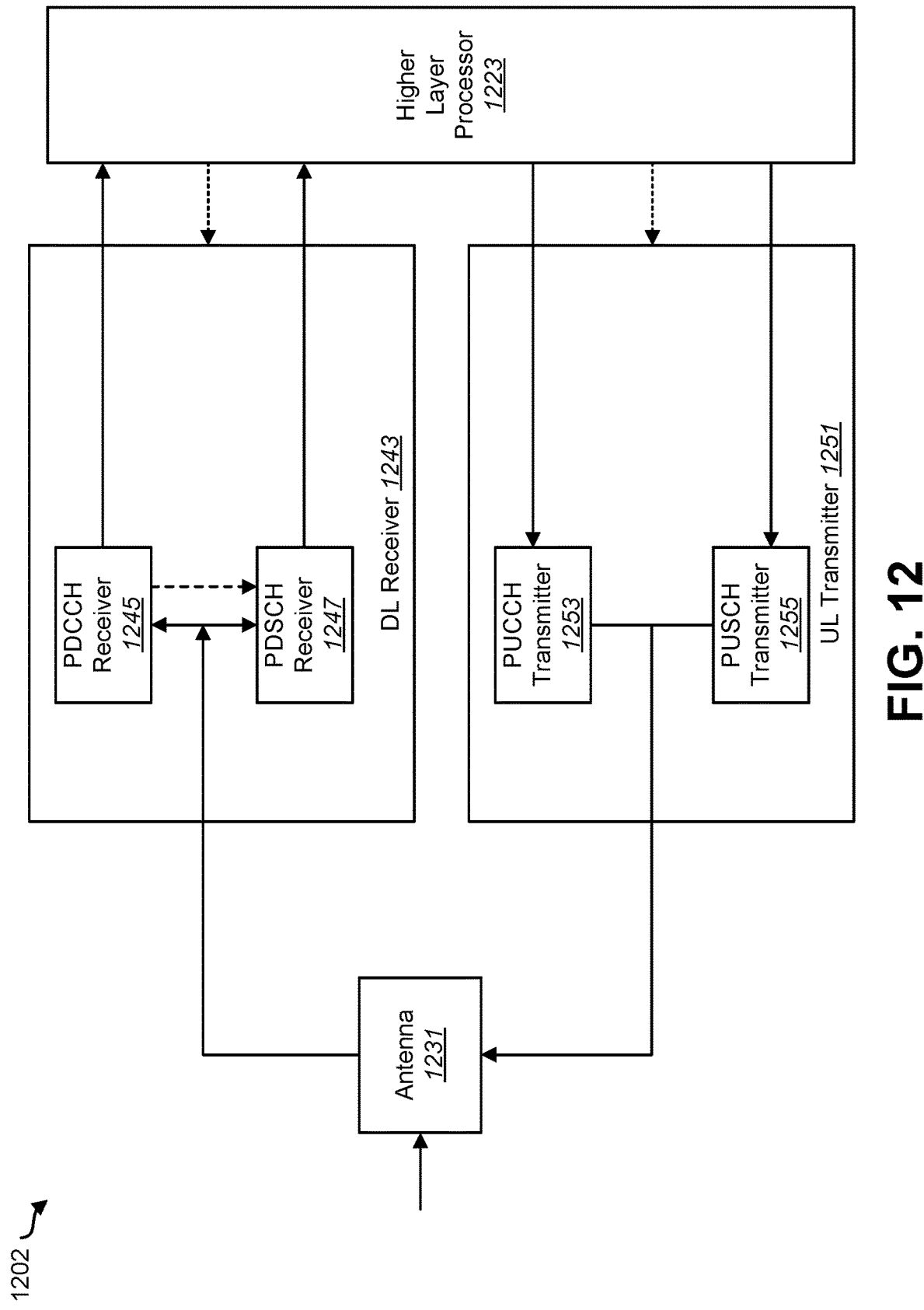
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
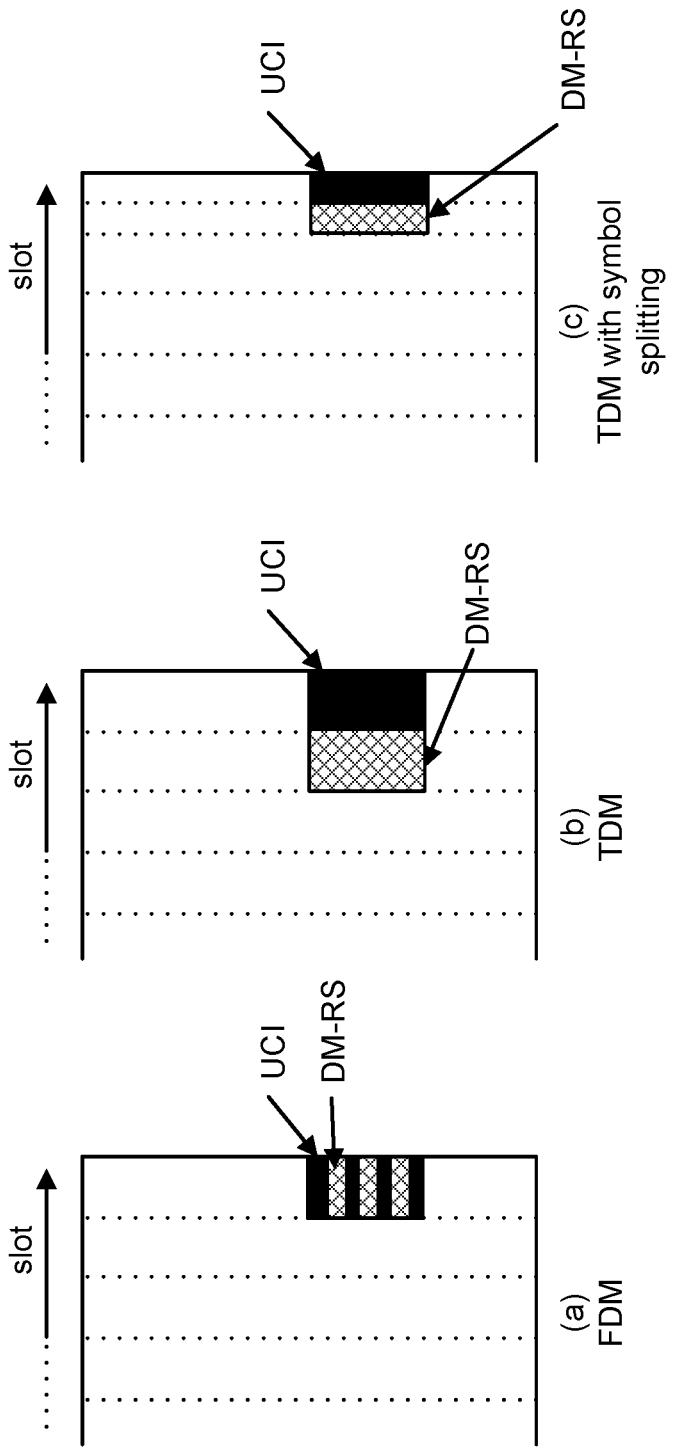
FIG. 13 illustrates examples of short PUCCH formats.

FIG. 13 illustrates examples of short PUCCH formats. A first example (a) is a frequency division multiplexing (FDM) case. A short PUCCH format may occupy only 1 symbol length. In this case, CP-OFDM modulation should be used, the reference symbols and UCI carrying symbols can be multiplexed in different subcarriers of a PUCCH resource.

A second example (b) is a time division multiplexing (TDM) case. The short PUCCH format occupies two symbols. In this case, both CP-OFDM and DFT-S-OFDM modulation can be used. In case of DFT-S-OFDM, reference symbol and the UCI carrying symbol can be TDM multiplexed.

A third example (c) is a TDM with symbol splitting case. The short PUCCH occupies 1 symbol of reference numerology by splitting it into 2 symbols with a higher numerology (i.e., double the subcarrier spacing and reduce the symbol length by half). This 1-symbol design is actually a 2-symbol design with a higher numerology, and the same design as 2-symbol PUCCH can be used.

FIG. 14 illustrates examples of 1-symbol PUCCH resource mapping. In particular, FIG. 14 illustrates examples of PUCCH resources mapping for 1 symbol short PUCCH with one or more PUCCH regions/subbands and localized/distributed resource mapping methods.

In FIG. 14(a), a localized PUCCH resource mapping is used where contiguous RBs are configured for a 1 symbol short PUCCH in a configured PUCCH region/subband. In FIG. 14(b), more than one PUCCH regions/subbands are configured, and a localized PUCCH resource mapping is used where contiguous RBs are configured for a 1 symbol short PUCCH in each PUCCH region/subband. In FIG. 14(c), a distributed PUCCH resource mapping is used where non-contiguous RBs are configured for a 1 symbol short PUCCH in a configured PUCCH region/subband. In FIG. 14(d), more than one PUCCH regions/subbands are configured, and a distributed PUCCH resource mapping is used where non-contiguous RBs are configured for a 1 symbol short PUCCH in each PUCCH region/subband.

FIG. 15 illustrates examples of reference symbol (RS) patterns for PUCCH in an Orthogonal Frequency Division Multiplexing (OFDM) symbol. FIG. 15 shows the reference signal pattern designs for 2 RS in each RB, 3 RS in each RB, 4 RS in each RB, and 6 RS in each RB.

FIG. 16 illustrates an example of demodulation reference signal (DMRS) multiplexing with frequency division multiplexing (FDM) for a 1-symbol short PUCCH. FIG. 16 shows RS multiplexing of 2 UEs 102 with different RS patterns. Orthogonal sequences can still be applied on the REs carrying coded UCI data. The RS for a first UE are multiplexed with the RS for a second UE.

FIG. 17 illustrates another example of RS multiplexing of 3 UEs with different RS patterns of 2 DMRS symbols. Orthogonal sequences can still be applied on the REs carrying coded UCI data. In this example, 3 UEs (UE1, UE2 and UE3) each use 2 different REs in a RB as DMRS. There are 6 UCI carrying symbols in a RB.

FIG. 18 illustrates an example of RS location in a 2-symbol short PUCCH with a discrete Fourier transform spread OFDM (DFT-S-OFDM). In a first method (a), the first symbol is always DMRS, and the second symbol is always for UCI data. The DMRS is transmitted first so that the base station (gNB 160) can decode earlier compared with a post-loaded DMRS. However, if different UEs 102 start short PUCCH at different symbols, the DMRS pattern of one UE 102 may collide with the UCI data part of another UE 102. This may cause interference to the Z-C sequence used for DMRS.

In a second method (b), to avoid interference due to RS misalignment among UEs 102, the location of the DMRS may be fixed in certain symbol locations. For example, a symbol with odd symbol index is used for DMRS, a symbol with even symbol index is used for UCI data, or vice versa. Therefore, depending on the starting symbol of a 2-symbol short PUCCH, the DMRS location may be in the first symbol of second symbol of a 2-symbol PUCCH.

In a third method (not shown), the RS location is changeable or configurable. The RS location within a 2-symbol PUCCH can be semi-statically configured by higher layer signaling for a given UE 102. The RS location within a 2-symbol PUCCH can be dynamically indicated by a DCI. The adjustable RS location can be used to avoid interference due to RS misalignment among different UEs 102.

FIG. 19 illustrates examples of 2-symbol PUCCH resource mapping. In FIG. 19(*a*), a localized PUCCH resource mapping is used where contiguous RBs are configured for a 2 symbol short PUCCH in a configured PUCCH region/subband. In FIG. 19(*b*), more than one PUCCH regions/subbands are configured, and a localized PUCCH resource mapping is used where contiguous RBs are configured for a 2 symbol short PUCCH in each PUCCH region/subband. In FIG. 19(*c*), a distributed PUCCH resource mapping is used where non-contiguous RBs are configured for a 2 symbol short PUCCH in a configured PUCCH region/subband. In FIG. 19(*d*), more than one PUCCH regions/subbands are configured, and a distributed PUCCH resource mapping is used where non-contiguous RBs are configured for a 2 symbol short PUCCH in each PUCCH region/subband.

Figure 20:
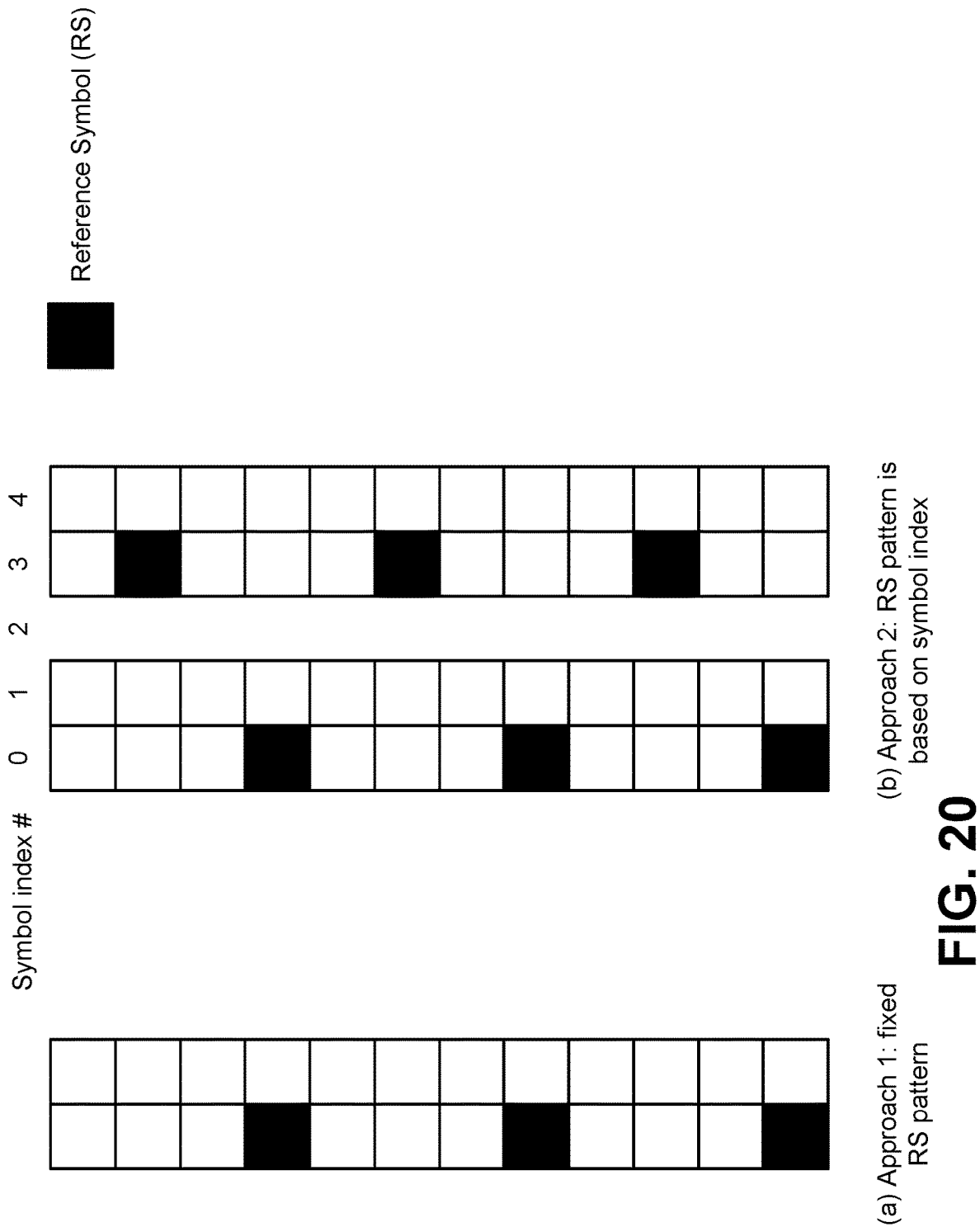
FIG. 20 illustrates examples of RS pattern determination.

FIG. 20 illustrates examples of RS pattern determination. In one approach (a), a fixed RS pattern in always applied. For example with 3 RS in a RB, pattern 1 is always applied. In another approach (b), the RS pattern is determined based on the symbol index of the starting symbol. For example, with 3 RS in a RB, pattern 1 is used if the starting symbol has an even index number, and pattern 2 is used if the starting symbol has an odd index number, or vice versa. In yet another approach (not shown), the RS pattern can be changeable or configurable. The RS pattern can be semi-statically configured by higher layer signaling or dynamically indicated by a DCI for a given UE 102.

FIG. 21 illustrates examples of RS located in two symbols. In one approach (a), the same RS pattern is applied to both symbols. The RS pattern can be fixed, or semi-statically configured by higher layer signaling, or dynamically indicated by a DCI for a given UE 102. In another approach (b), different RS patterns are used in different symbols. An interlaced pattern is used in different symbols. The RS pattern on a symbol may be configured semi-statically. The RS pattern on a symbol may be indicated by a based station via a DCI. The RS pattern may be determined based on the symbol index of the given symbol (e.g., pattern 1 is used for symbol with even index number, and pattern 2 is used for symbol with odd index number, or vice versa).

FIG. 22 illustrates examples of RS multiplexing of two UEs with different RS patterns. Orthogonal sequences can still be applied on the REs carrying coded UCI data. In one approach (a), the RS multiplexing of different UEs may be allocated in the same symbol. In another approach (b), the RS multiplexing of different UEs may be allocated in different symbols.

FIG. 23 illustrates examples of short PUCCH transmission with beam sweeping. In a first approach (a), a 1-symbol short PUCCH can be transmitted in any one of the configured PUCCH symbols. In a second approach (b), a 2-symbol short PUCCH can be transmitted on any two consecutive symbols within the configured PUCCH symbols. In a third approach (c), a 2-symbol short PUCCH can be transmitted in any two symbols within the configured PUCCH symbols.

Figure 24:
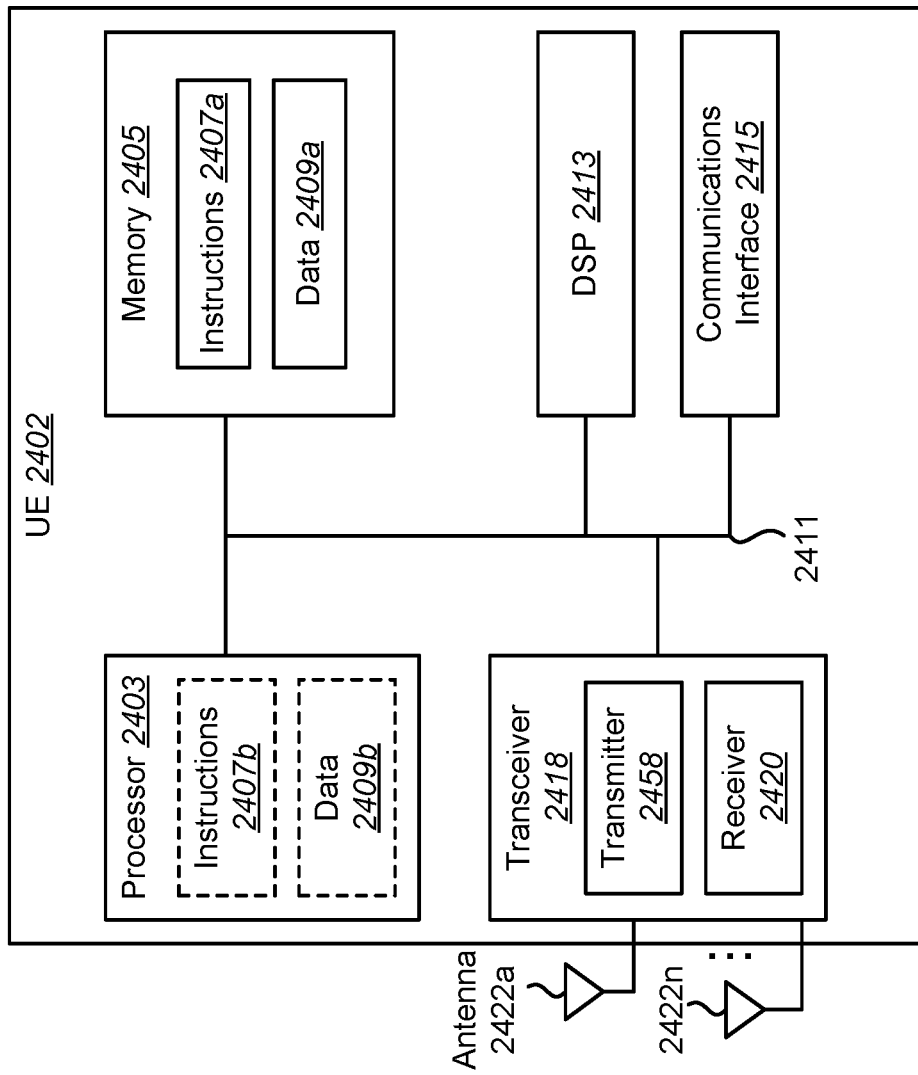
FIG. 24 illustrates various components that may be utilized in a UE.

FIG. 24 illustrates various components that may be utilized in a UE 2402. The UE 2402 described in connection with FIG. 24 may be implemented in accordance with the UE 102 described in connection with FIG. 1. The UE 2402 includes a processor 2403 that controls operation of the UE 2402. The processor 2403 may also be referred to as a central processing unit (CPU). Memory 2405, which may include read-only memory (ROM), random access memory (RAM), a combination of the two or any type of device that may store information, provides instructions 2407*a* and data 2409*a* to the processor 2403. A portion of the memory 2405 may also include non-volatile random access memory (NVRAM). Instructions 2407*b* and data 2409*b* may also reside in the processor 2403. Instructions 2407*b* and/or data 2409*b* loaded into the processor 2403 may also include instructions 2407*a* and/or data 2409*a* from memory 2405 that were loaded for execution or processing by the processor 2403. The instructions 2407*b* may be executed by the processor 2403 to implement the methods described above.

The UE 2402 may also include a housing that contains one or more transmitters 2458 and one or more receivers 2420 to allow transmission and reception of data. The transmitter(s) 2458 and receiver(s) 2420 may be combined into one or more transceivers 2418. One or more antennas 2422*a-n* are attached to the housing and electrically coupled to the transceiver 2418.

The various components of the UE 2402 are coupled together by a bus system 2411, which may include a power bus, a control signal bus and a status signal bus, in addition to a data bus. However, for the sake of clarity, the various buses are illustrated in FIG. 24 as the bus system 2411. The UE 2402 may also include a digital signal processor (DSP) 2413 for use in processing signals. The UE 2402 may also include a communications interface 2415 that provides user access to the functions of the UE 2402. The UE 2402 illustrated in FIG. 24 is a functional block diagram rather than a listing of specific components.

Figure 25:
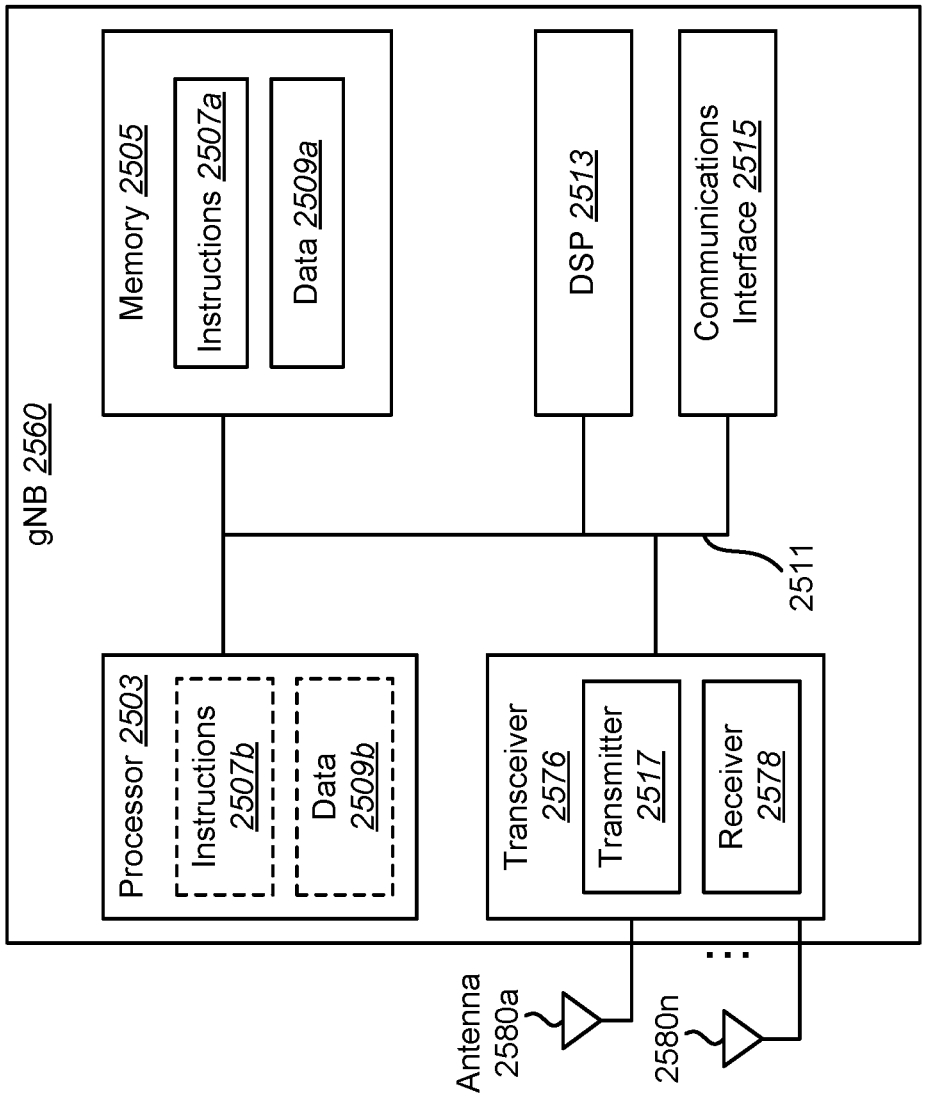
FIG. 25 illustrates various components that may be utilized in a gNB.

FIG. 25 illustrates various components that may be utilized in a gNB 2560. The gNB 2560 described in connection with FIG. 25 may be implemented in accordance with the gNB 160 described in connection with FIG. 1. The gNB 2560 includes a processor 2503 that controls operation of the gNB 2560. The processor 2503 may also be referred to as a central processing unit (CPU). Memory 2505, which may include read-only memory (ROM), random access memory (RAM), a combination of the two or any type of device that may store information, provides instructions 2507*a* and data 2509*a* to the processor 2503. A portion of the memory 2505 may also include non-volatile random access memory (NVRAM). Instructions 2507*b* and data 2509*b* may also reside in the processor 2503. Instructions 2507*b* and/or data 2509*b* loaded into the processor 2503 may also include instructions 2507*a* and/or data 2509*a* from memory 2505 that were loaded for execution or processing by the processor 2503. The instructions 2507*b* may be executed by the processor 2503 to implement the methods described above.

The gNB 2560 may also include a housing that contains one or more transmitters 2517 and one or more receivers 2578 to allow transmission and reception of data. The transmitter(s) 2517 and receiver(s) 2578 may be combined into one or more transceivers 2576. One or more antennas 2580a-n are attached to the housing and electrically coupled to the transceiver 2576.

The various components of the gNB 2560 are coupled together by a bus system 2511, which may include a power bus, a control signal bus and a status signal bus, in addition to a data bus. However, for the sake of clarity, the various buses are illustrated in FIG. 25 as the bus system 2511. The gNB 2560 may also include a digital signal processor (DSP) 2513 for use in processing signals. The gNB 2560 may also include a communications interface 2515 that provides user access to the functions of the gNB 2560. The gNB 2560 illustrated in FIG. 25 is a functional block diagram rather than a listing of specific components.

Figure 26:
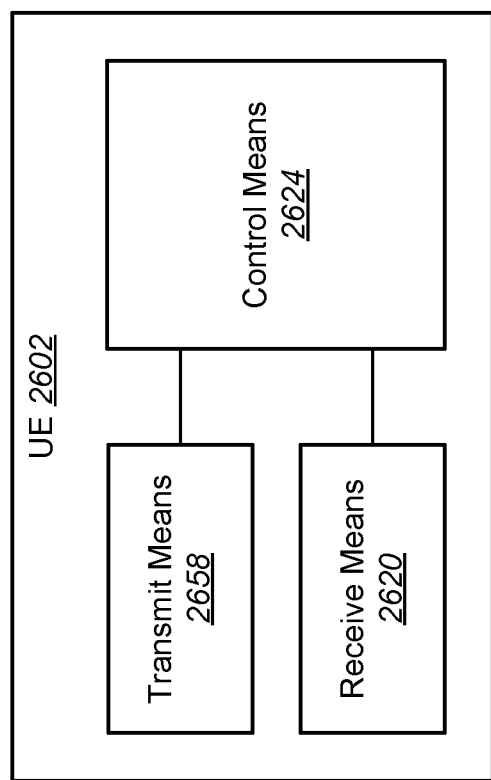
FIG. 26 is a block diagram illustrating one implementation of a UE in which systems and methods for short PUCCH design for 5G NR operations may be implemented.

FIG. 26 is a block diagram illustrating one implementation of a UE 2602 in which systems and methods for a short PUCCH design for 5G NR operations may be implemented. The UE 2602 includes transmit means 2658, receive means 2620 and control means 2624. The transmit means 2658, receive means 2620 and control means 2624 may be configured to perform one or more of the functions described in connection with FIG. 1 above. FIG. 24 above illustrates one example of a concrete apparatus structure of FIG. 26. Other various structures may be implemented to realize one or more of the functions of FIG. 1. For example, a DSP may be realized by software.

Figure 27:
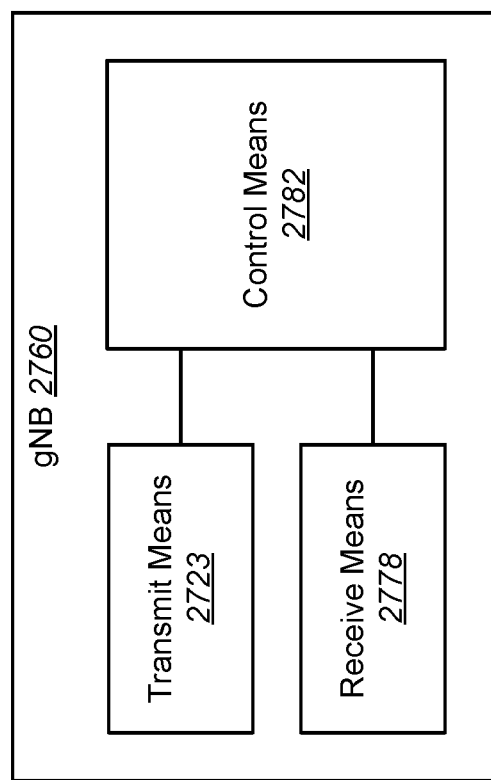
FIG. 27 is a block diagram illustrating one implementation of a gNB in which systems and methods for short PUCCH design for 5G NR operations may be implemented.

FIG. 27 is a block diagram illustrating one implementation of a gNB 2760 in which systems and methods for a short PUCCH design for 5G NR operations may be implemented. The gNB 2760 includes transmit means 2717, receive means 2778 and control means 2782. The transmit means 2717, receive means 2778 and control means 2782 may be configured to perform one or more of the functions described in connection with FIG. 1 above. FIG. 25 above illustrates one example of a concrete apparatus structure of FIG. 27. Other various structures may be implemented to realize one or more of the functions of FIG. 1. For example, a DSP may be realized by software.

Figure 28:
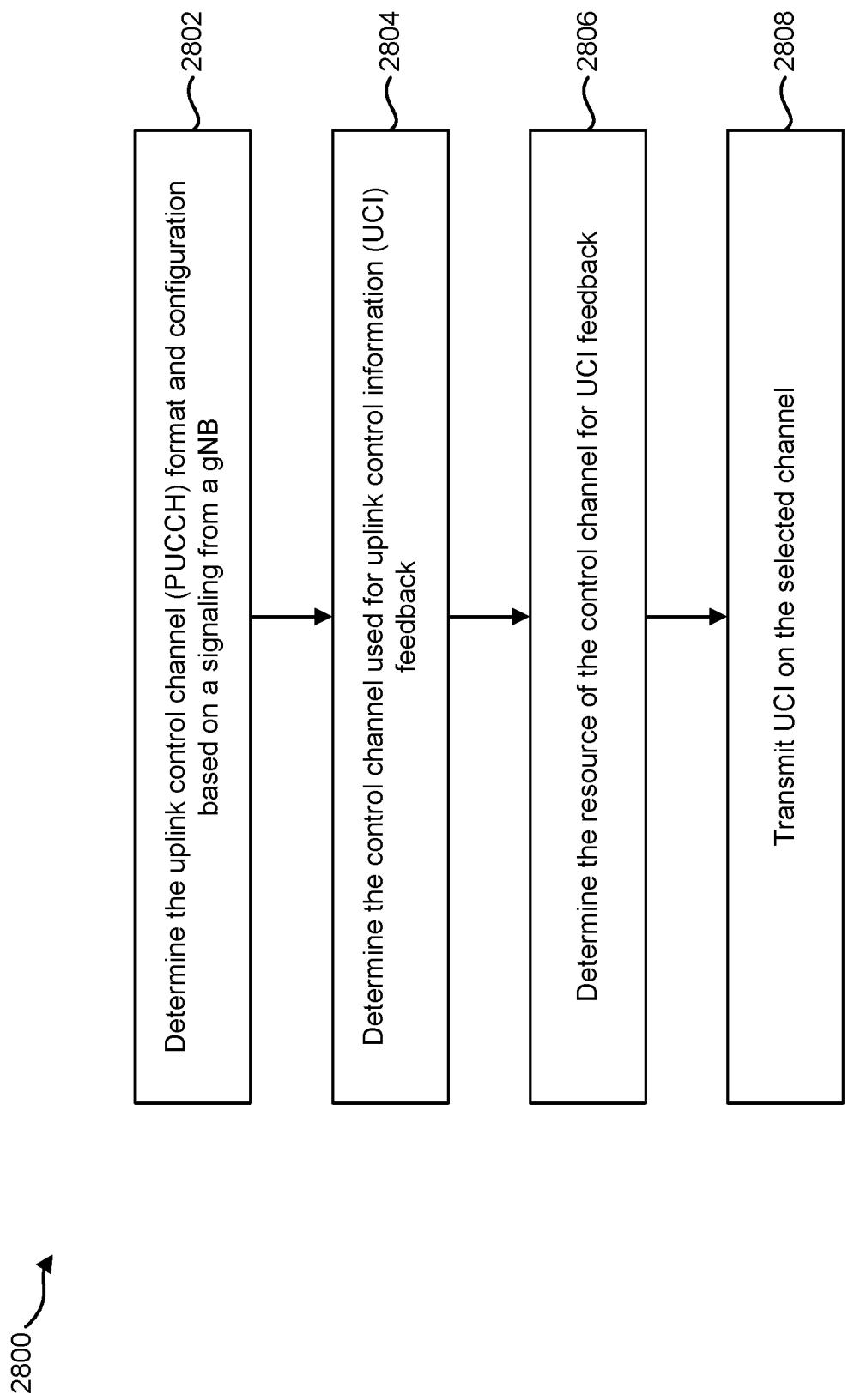
FIG. 28 is a flow diagram illustrating a method for implementing a short PUCCH design for 5G NR.

FIG. 28 is a flow diagram illustrating a method 2800 for implementing a short PUCCH design for 5G NR. The method 2800 may be implemented by a UE 102. The UE 102 may determine 2802 the uplink control channel (PUCCH) format and configuration based on a signaling from a gNB 160. For example, the PUCCH format and configuration may include at least a short PUCCH format and a long PUCCH format. The short PUCCH format and long PUCCH format may have the same or different waveforms and/or numerologies.

The PUCCH format may include a localized or distributed resource mapping in one or more PUCCH region/subbands. Determining the uplink control channel (PUCCH) resource for UCI reporting may be done by combination of semi-static RRC configuration and dynamic DCI indication. The semi-static RRC configuration and dynamic DCI indication may include signaling for HARQ-ACK timing and PUCCH resources.

For the UE 102, determining the uplink control channel (PUCCH) resource for UCI reporting may be done by combination of semi-static RRC configuration and dynamic DCI indication.

For the UE, semi-static RRC configuration and dynamic DCI indication from a base station 160 may include signaling for HARQ-ACK timing and PUCCH resources.

A short PUCCH may be a 1-symbol short PUCCH. A 1-symbol short PUCCH may employ a cyclic prefix Orthogonal Frequency Division Multiplexing (CP-OFDM) waveform. A format may consist of a number of resource blocks (RBs), a reference symbol (RS) pattern, and/or orthogonal sequences on RS and data symbols, and/or one or more control resource regions. The RS pattern of different UEs 102 may be multiplexed with an orthogonal sequence or in a frequency division multiplexing (FDM) manner.

A short PUCCH may be a 2-symbol short PUCCH. A 2-symbol short PUCCH may employ a discrete Fourier transform spread OFDM (DFT-S-OFDM) waveform. A format may consist of a number of RBs, a RS location, and/or orthogonal sequences on RS and data symbols, and/or one or more control resource regions. Alternatively, a 2-symbol short PUCCH may employ a CP-OFDM waveform, and a format consists of a number of RBs, a RS pattern and location, and/or orthogonal sequences on RS and data symbols, and/or one or more control resource regions.

The RS location may be the first symbol of the 2-symbol short PUCCH. The RS location may be determined by the symbol index of a 2-symbol short PUCCH. The RS location of the 2-symbol short PUCCH may be indicated by gNB signaling.

At least for a frequency band over 6 GHz, a UE 102 may be configured with a set of symbols for a short PUCCH, and a short PUCCH is transmitted by selecting one symbol for a 1-symbol PUCCH and 2 symbols for a 2-symbol PUCCH within the set. The 2 symbols selected for the 2-symbol PUCCH within the set can be contiguous or separated within the set. The symbol(s) may be selected based on a gNB indication.

The UE 102 may determine 2804 the control channel used for uplink control information (UCI) feedback. The UE 102 may determine 2806 the resource of the control channel for UCI feedback. The UE 102 may transmit 2808 UCI on the selected channel.

Figure 29:
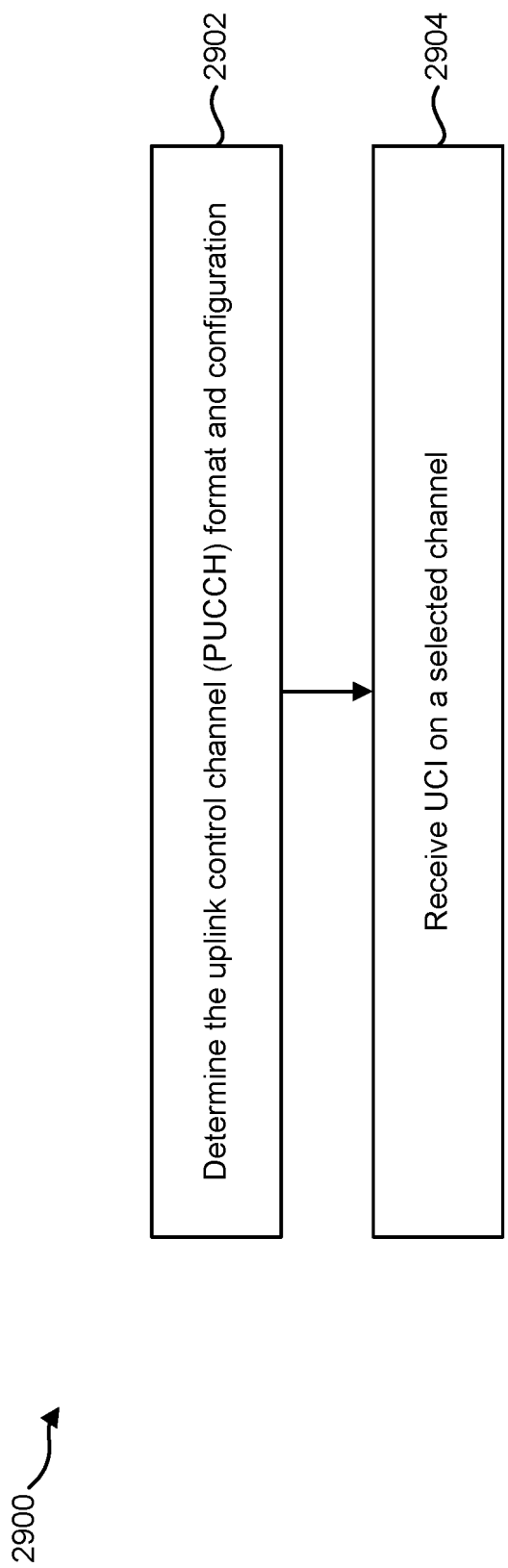
FIG. 29 is a flow diagram illustrating another method for implementing a short PUCCH design for 5G NR.

FIG. 29 is a flow diagram illustrating another method 2900 for implementing a short PUCCH design for 5G NR. The method 2900 may be implemented by a base station (gNB) 160. The gNB 160 may determine 2902 the uplink control channel (PUCCH) format and configuration. This may be accomplished as described in connection with FIG. 27. For example, the PUCCH format and configuration may include at least a short PUCCH format and a long PUCCH format. The short PUCCH format and long PUCCH format may have the same or different waveforms and/or numerologies.

The PUCCH format may include a localized or distributed resource mapping in one or more PUCCH region/subbands. Determining the uplink control channel (PUCCH) resource for UCI reporting may be done by combination of semi-static RRC configuration and dynamic DCI indication. The semi-static RRC configuration and dynamic DCI indication may include signaling for HARQ-ACK timing and PUCCH resources.

The gNB 160 may receive 2904 UCI on a selected channel. A control channel used for uplink control information (UCI) feedback and a resource of the control channel for UCI feedback may be determined by a UE 102 based on signaling from the gNB 160.

Figure 30:
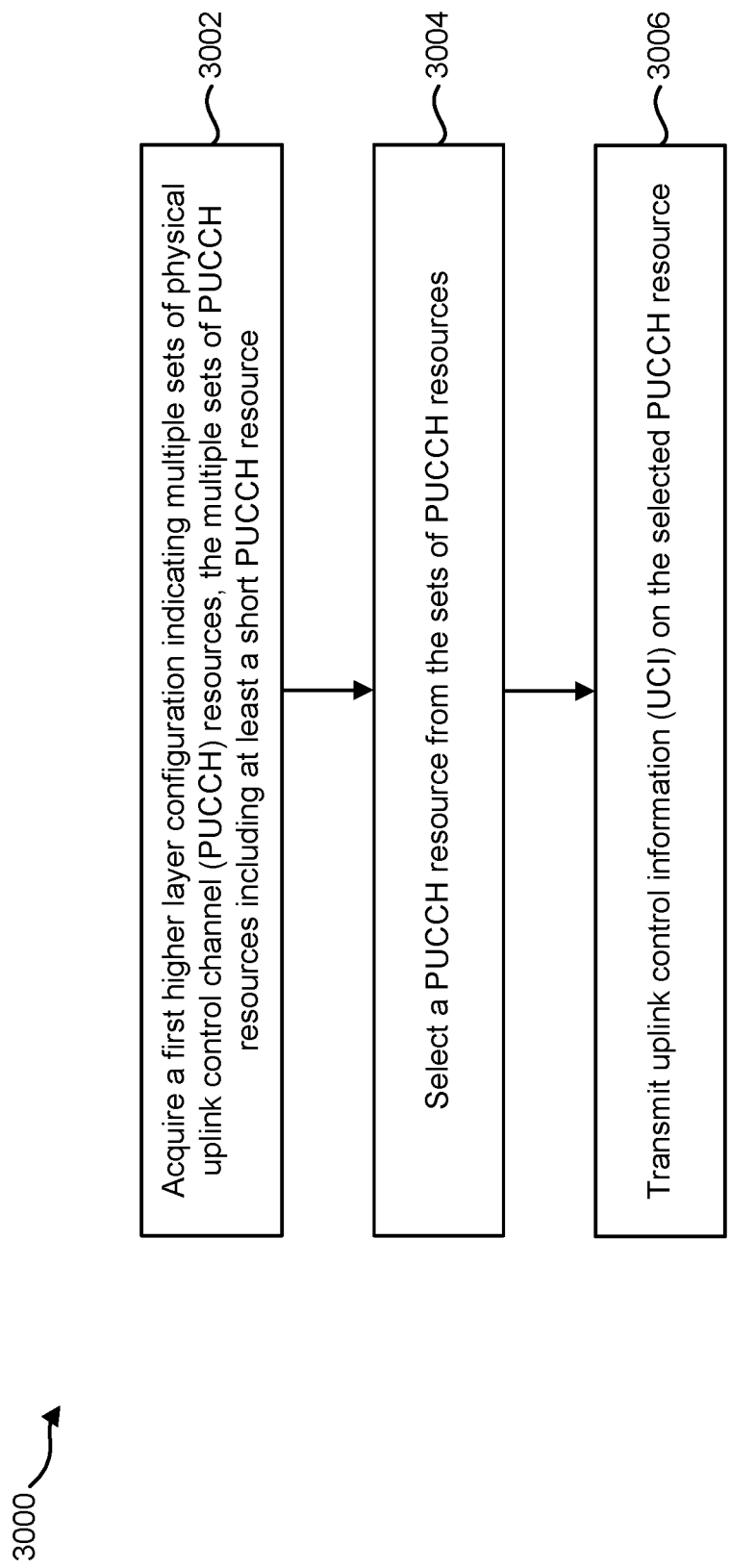
FIG. 30 is a flow diagram illustrating another method for implementing a short PUCCH design for 5G NR.

FIG. 30 is a flow diagram illustrating another method 3000 for implementing a short PUCCH design for 5G NR. The method 3000 may be implemented by a UE 102. The UE 102 may acquire 3002 a first higher layer configuration indicating multiple sets of physical uplink control channel (PUCCH) resources. The multiple sets of PUCCH resources may include at least a short PUCCH resource.

The UE 102 may select 3004 a PUCCH resource from the sets of PUCCH resources. Selecting 3004 a PUCCH resource from the sets of PUCCH resources may be based on a dynamic downlink control information (DCI) indication of the PUCCH resource index The UE 102 may transmit 3006 uplink control information (UCI) on the selected PUCCH resource.

The first higher layer configuration may include at least the starting symbol index, the starting resource block (RB) index, the number of symbols, the number of resource blocks (RBs), and whether frequency hopping is applied in a case of a short PUCCH with two symbols.

In a case that frequency hopping is configured for a two symbol PUCCH, PUCCH demodulation reference signal (DMRS) locations in both symbols may be the same between two symbols. In a case that transmit diversity is configured, another PUCCH resource which is linked to the selected PUCCH resource may be selected.

Figure 31:
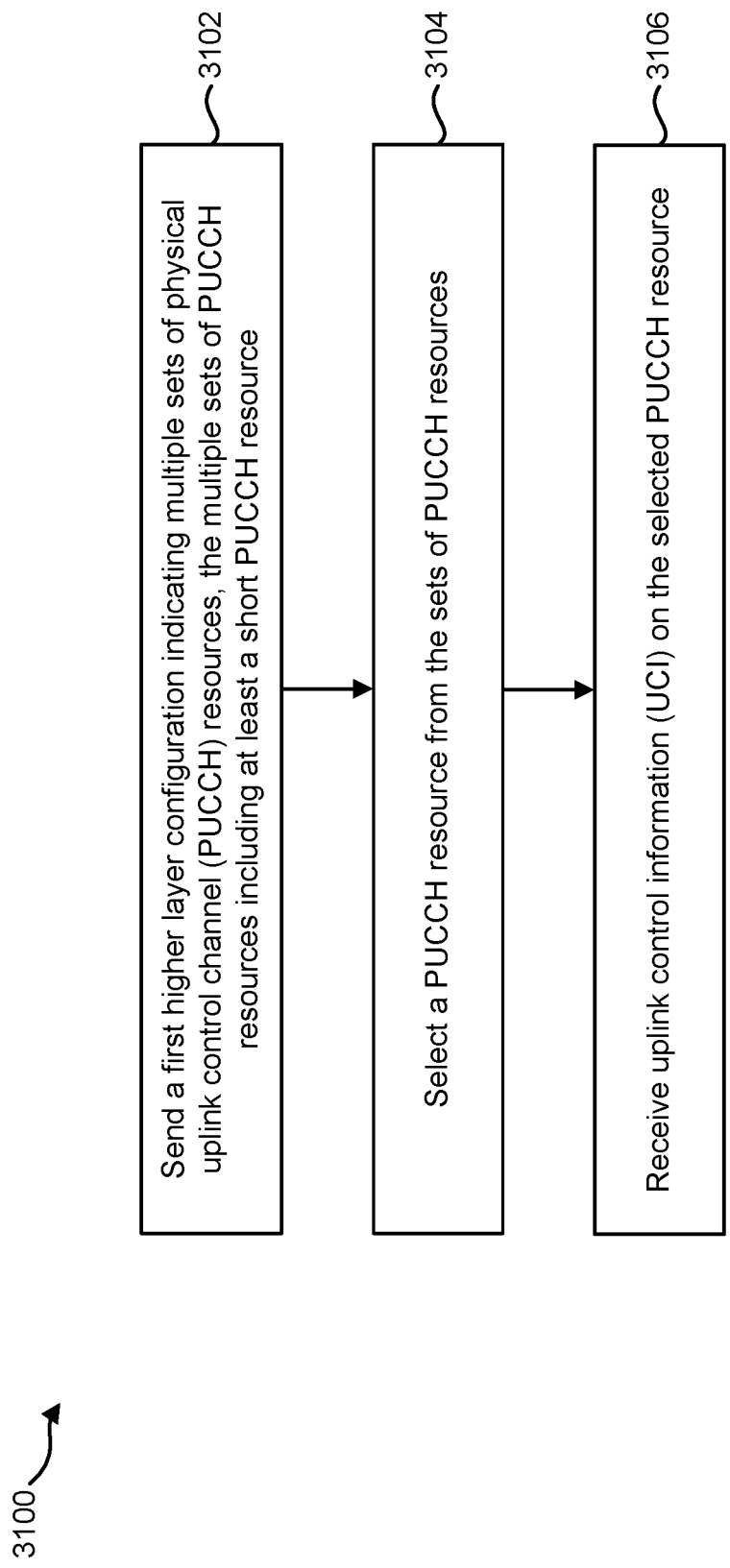
FIG. 31 is a flow diagram illustrating another method for implementing a short PUCCH design for 5G NR.

FIG. 31 is a flow diagram illustrating another method 3100 for implementing a short PUCCH design for 5G NR. The method 3100 may be implemented by a base station (gNB) 160. The gNB 160 may send 3102 a first higher layer configuration indicating multiple sets of physical uplink control channel (PUCCH) resources. The multiple sets of PUCCH resources may include at least a short PUCCH resource. The first higher layer configuration may include at least the starting symbol index, the starting resource block (RB) index, the number of symbols, the number of resource blocks (RBs), and whether frequency hopping is applied in a case of a short PUCCH with two symbols.

The gNB 160 may select 3104 a PUCCH resource from the sets of PUCCH resources. Selecting 3104 a PUCCH resource from the sets of PUCCH resources may be based on a dynamic downlink control information (DCI) indication of the PUCCH resource index. The gNB 160 may receive 3106 uplink control information (UCI) on the selected PUCCH resource.

In a case that frequency hopping is configured for a two symbol PUCCH, PUCCH demodulation reference signal (DMRS) locations in both symbols may be the same between two symbols. In a case that transmit diversity is configured, another PUCCH resource which is linked to the selected PUCCH resource may be selected.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
a processor; and
memory in electronic communication with the processor, wherein instructions stored in the memory are executable to:
acquire a radio resource control (RRC) configuration indicating multiple sets of physical uplink control channel (PUCCH) resources and a set of Hybrid Automatic Repeat Request (HARQ)-Acknowledgement (ACK) timings;
select, based on a PUCCH resource indication included in downlink control information (DCI), a PUCCH resource from a set of PUCCH resources, the set of PUCCH resources being from the multiple sets of PUCCH resources; and
transmit uplink control information (UCI) on the selected PUCCH resource in a slot corresponding to a HARQ-ACK timing which is indicated, from among the set of HARQ-ACK timings, by a HARQ-ACK timing indication included in the DCI,
wherein after the UE acquires the RRC configuration, the PUCCH resource is selected, based on the PUCCH resource indication in the same DCI, from the set of PUCCH resources.

2. The UE of claim 1, wherein the RRC configuration comprises at least a starting symbol index, a starting resource block (RB) index, a number of symbols, a number of resource blocks (RBs), and whether frequency hopping is applied in a case of a two symbol PUCCH.

3. The UE of claim 2, wherein, in a case that frequency hopping is configured for a two symbol PUCCH, PUCCH demodulation reference signal (DMRS) locations in both symbols are the same between two symbols.

4. The UE of claim 1, wherein, in a case that transmit diversity is configured, another PUCCH resource which is linked to the selected PUCCH resource is selected.

5. A base station, comprising:
a processor; and
memory in electronic communication with the processor, wherein instructions stored in the memory are executable to:
send, to a user equipment (UE), a radio resource control (RRC) configuration indicating multiple sets of physical uplink control channel (PUCCH) resources and a set of Hybrid Automatic Repeat Request (HARQ)-Acknowledgement (ACK) timings;
send, to the UE, a PUCCH resource indication included in downlink control information (DCI) to be used for selecting a PUCCH resource from a set of PUCCH resources, the set of PUCCH resources being from the multiple sets of PUCCH resources; and
receive, from the UE, uplink control information (UCI) on the selected PUCCH resource in a slot corresponding to a HARQ-ACK timing which is indicated, from among the set of HARQ-ACK timings, by a HARQ-ACK timing indication included in the DCI,
wherein after the UE receives the RRC configuration, the PUCCH resource is selected, based on the PUCCH resource indication in the same DCI, from the set of PUCCH resources.

6. The base station of claim 5, wherein the RRC configuration comprises at least a starting symbol index, a starting resource block (RB) index, a number of symbols, a number of resource blocks (RBs), and whether frequency hopping is applied in a case of a two symbol PUCCH.

7. The base station of claim 6, wherein, in a case that frequency hopping is configured for a two symbol PUCCH, PUCCH demodulation reference signal (DMRS) locations in both symbols are the same between two symbols.

8. The base station of claim 5, wherein, in a case that transmit diversity is configured, another PUCCH resource which is linked to the selected PUCCH resource is selected.

9. A method for a user equipment (UE), the method comprising:
acquiring a radio resource control (RRC) configuration indicating multiple sets of physical uplink control channel (PUCCH) resources and a set of Hybrid Automatic Repeat Request (HARQ)-Acknowledgement (ACK) timings;
selecting, based on a PUCCH resource indication included in downlink control information (DCI), a PUCCH resource from a set of PUCCH resources, the set of PUCCH resources being from the multiple sets of PUCCH resources; and
transmitting uplink control information (UCI) on the selected PUCCH resource in a slot corresponding to a HARQ-ACK timing which is indicated, from among the set of HARQ-ACK timings, by a HARQ-ACK timing indication included in the DCI,
wherein after the UE acquires the RRC configuration, the PUCCH resource is selected, based on the PUCCH resource indication in the same DCI, from the set of PUCCH resources.

10. A method for a base station, the method comprising:
sending a radio resource control (RRC) configuration indicating multiple sets of physical uplink control channel (PUCCH) resources and a set of Hybrid Automatic Repeat Request (HARQ)-Acknowledgement (ACK) timings;
selecting, based on a PUCCH resource indication included in downlink control information (DCI), a PUCCH resource from a set of PUCCH resources, the set of PUCCH resources being from the multiple sets of PUCCH resources; and
receiving uplink control information (UCI) on the selected PUCCH resource in a slot corresponding to a HARQ-ACK timing which is indicated, from among the set of HARQ-ACK timings, by a HARQ-ACK timing indication included in the DCI,
wherein after the UE receives the RRC configuration, the PUCCH resource is selected, based on the PUCCH resource indication in the same DCI, from the set of PUCCH resources.

* * * * *